(12) United States Patent
Chang et al.

(10) Patent No.: US 11,621,479 B2
(45) Date of Patent: Apr. 4, 2023

(54) ELECTROMAGNETIC WAVE TRANSMISSION STRUCTURE, ELECTROMAGNETIC WAVE TRANSMISSION STRUCTURE ARRAY, AND ELECTROMAGNETIC WAVE TRANSMISSION AND SHIFTING METHOD

(71) Applicant: NATIONAL CHUNG CHENG UNIVERSITY, Chiayi County (TW)

(72) Inventors: Sheng-Fuh Chang, Chiayi County (TW); Chia-Chan Chang, Chiayi (TW); Shih-Cheng Lin, Taitung (TW); Yuan-Chun Lin, Hsinchu County (TW)

(73) Assignee: National Chung Cheng University, Chiayi County (TW)

( * ) Notice: Subject to any disclaimer, the term of this patent is extended or adjusted under 35 U.S.C. 154(b) by 190 days.

(21) Appl. No.: 17/227,094

(22) Filed: Apr. 9, 2021

(65) Prior Publication Data
US 2022/0238991 A1 Jul. 28, 2022

(30) Foreign Application Priority Data
Jan. 27, 2021 (TW) ................................ 110103068

(51) Int. Cl.
*H01Q 1/38* (2006.01)
*H01Q 15/24* (2006.01)
(52) U.S. Cl.
CPC .............. *H01Q 1/38* (2013.01); *H01Q 15/24* (2013.01)

(58) Field of Classification Search
CPC ........ H01Q 1/38; H01Q 15/24; H01Q 19/065; H04B 1/38
See application file for complete search history.

(56) References Cited

U.S. PATENT DOCUMENTS

| 6,720,936 B1 | 4/2004 | Koolish et al. |
| 8,384,614 B2 | 2/2013 | Kennedy et al. |
| 2005/0088342 A1* | 4/2005 | Parsche ................ H01Q 9/0464 343/700 MS |

(Continued)

OTHER PUBLICATIONS

Reference Phase in Diffractive Lens Antennas: A Review, Igor V. Minin, et al., J Infrared Milli Terahz Waves (2011) 32: 801 822.

(Continued)

*Primary Examiner* — David E Lotter
(74) *Attorney, Agent, or Firm* — Rosenberg, Klein & Lee

(57) ABSTRACT

An electromagnetic wave transmission structure adapted to cause convergence of an electromagnetic wave includes a substrate and a transmission unit provided on the substrate and including an annular metal plate. The annular metal plate has a weighted average inner radius and a weighted average outer radius each related to the wavelength of the electromagnetic wave, the distance between the electromagnetic wave transmission structure and a focal point defined as the point of convergence of the electromagnetic wave, and the distance between the source of the electromagnetic wave and the focal point. The plural inner and outer radii of the annular metal plate have the same trend of variation. Each inner or outer radius corresponds to a weight related to the reference included angle formed between the inner or outer radius and a reference axis.

21 Claims, 32 Drawing Sheets

(56) References Cited

U.S. PATENT DOCUMENTS

2018/0205151 A1* 7/2018 Celik ............... H01Q 15/006
2022/0263252 A1* 8/2022 Zhao ................ H01Q 1/38

OTHER PUBLICATIONS

Indoor Signal Focusing by Means of Fresnel Zone Plate Lens Attached to Building Wall, Hristo D. Hristov, et al., IEEE Transactions on Antennas and Propagation, vol. 52, No. 4, Apr. 2004.

* cited by examiner

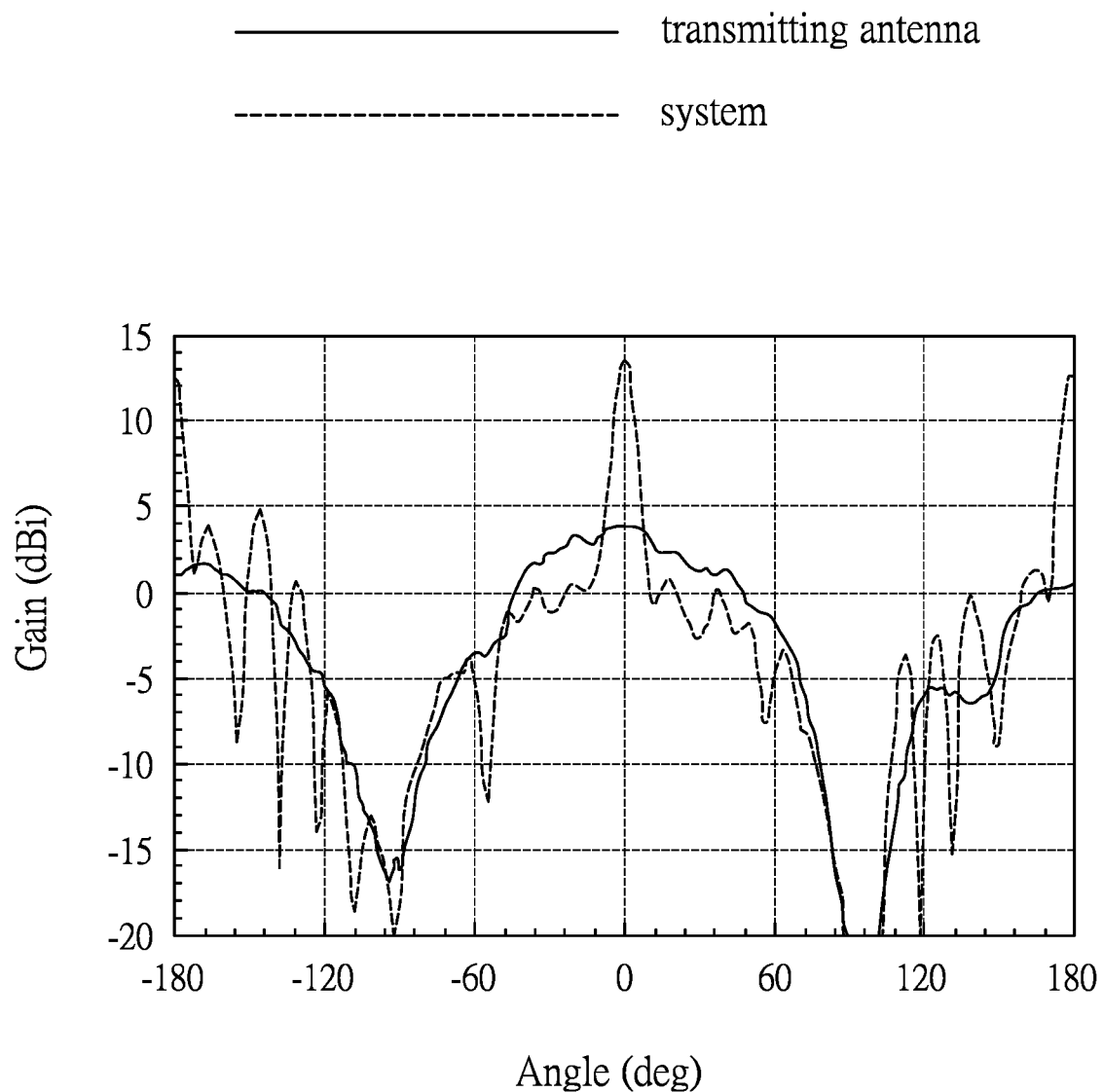
F I G . 10

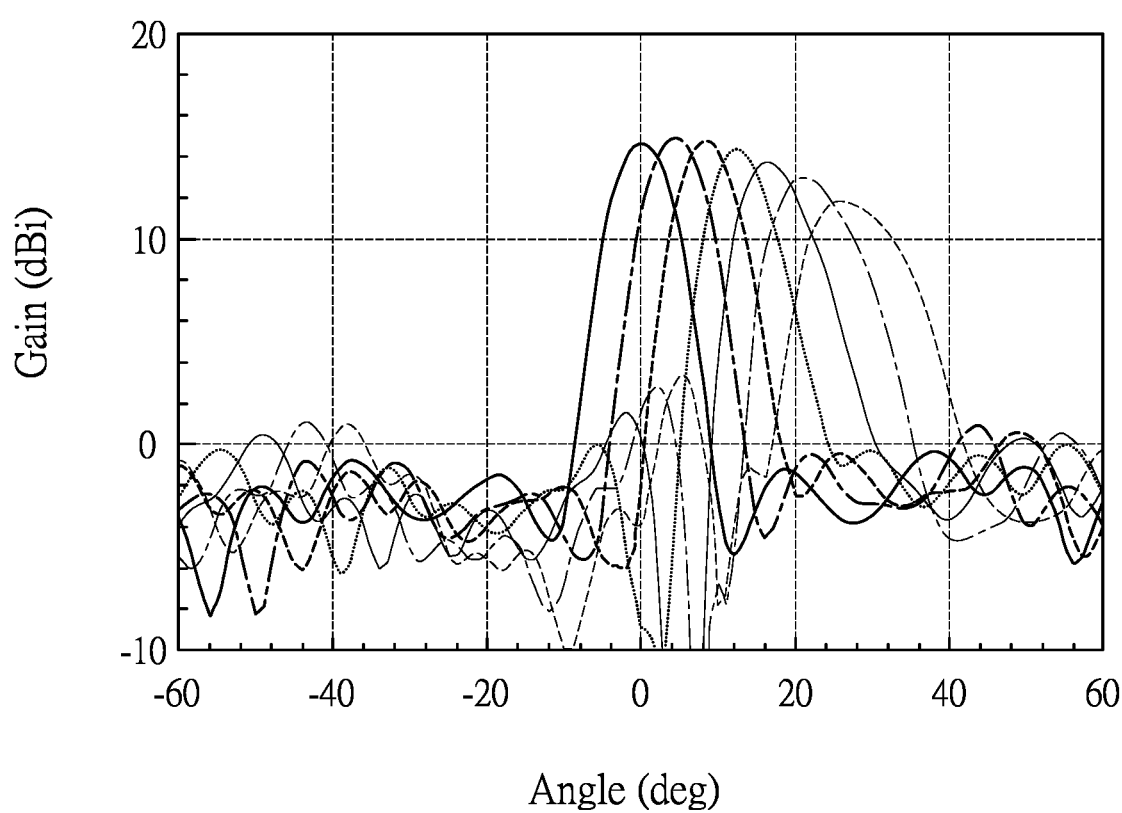
F I G . 14

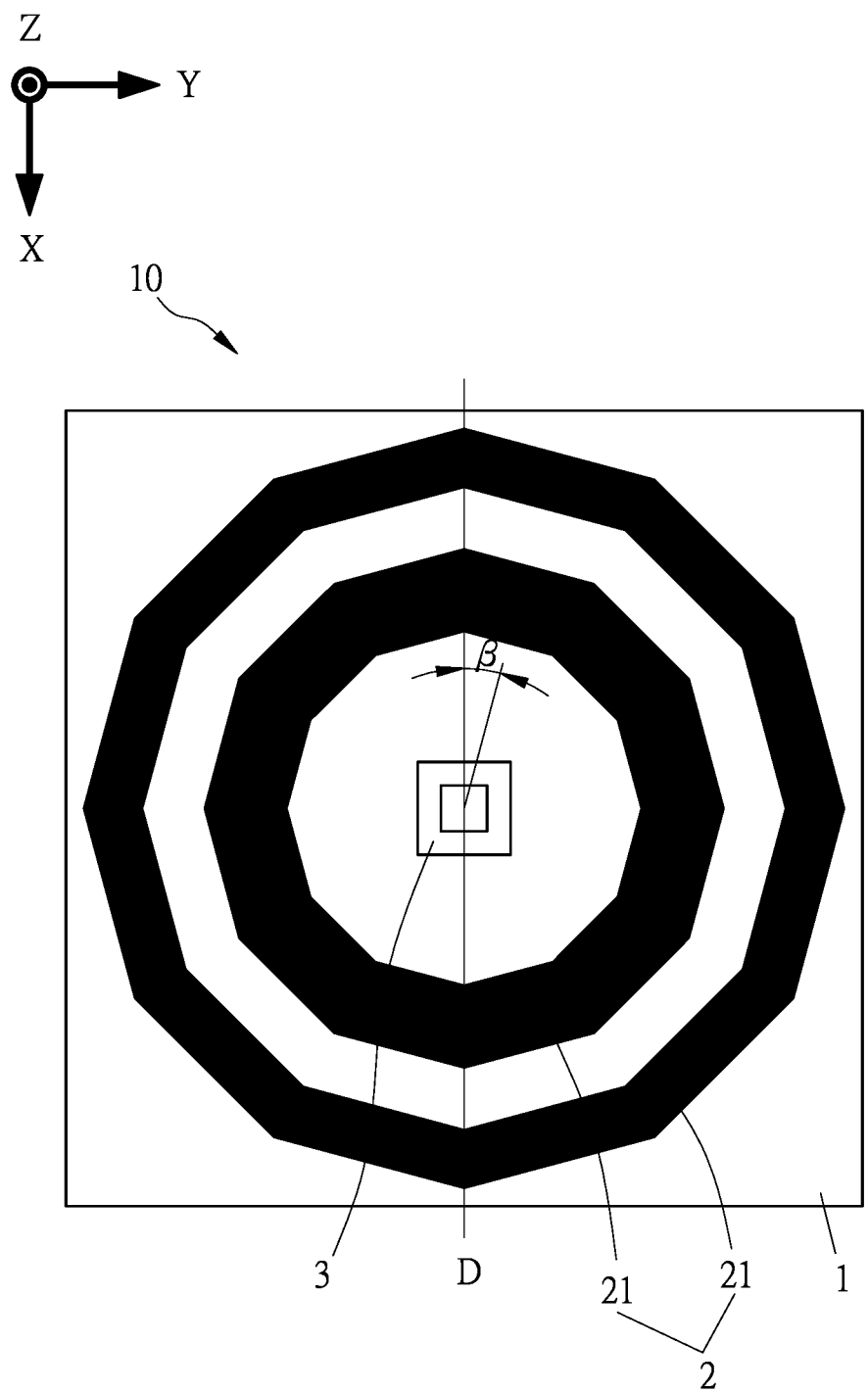
F I G . 30

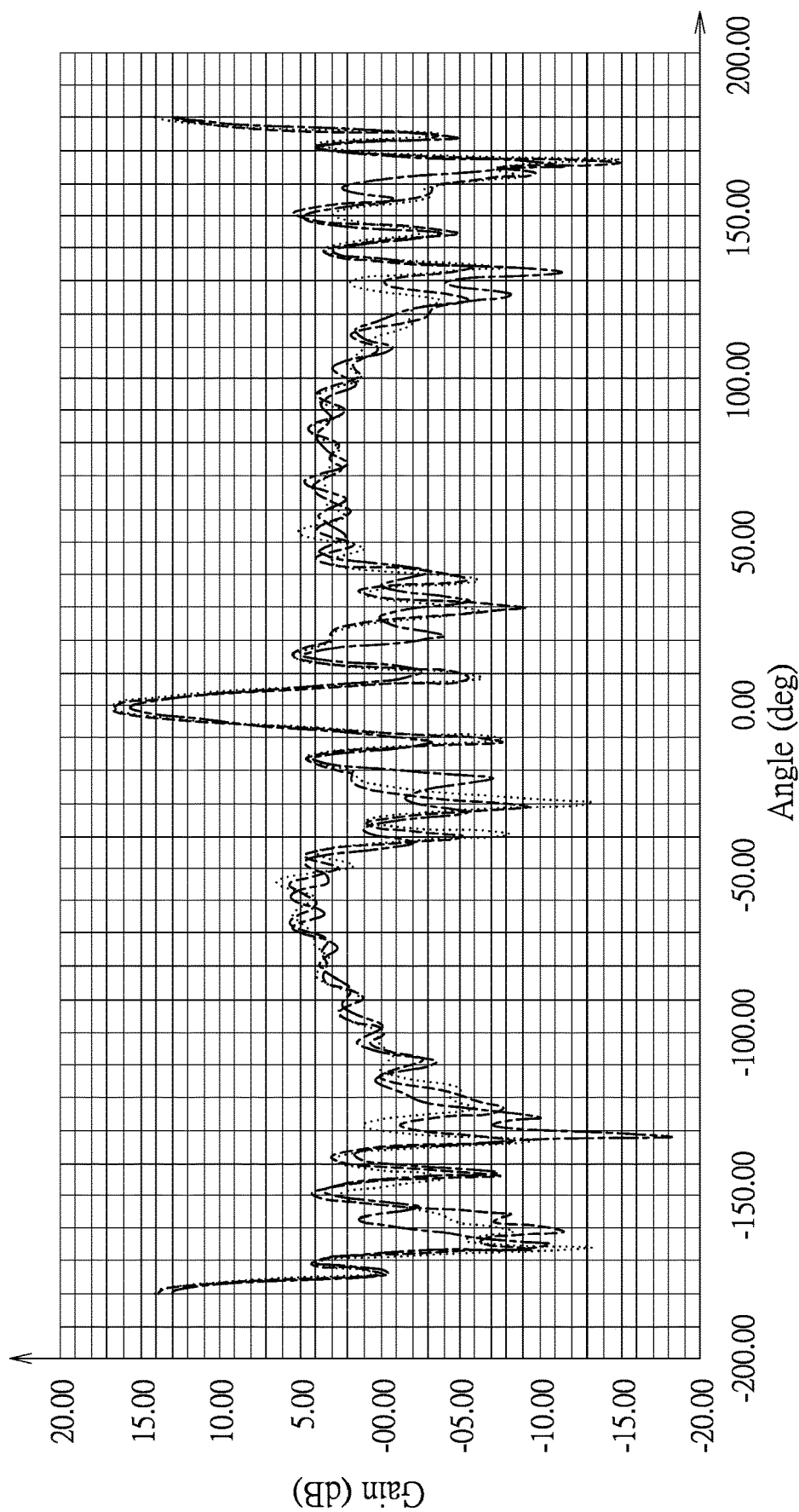
F I G. 31

ELECTROMAGNETIC WAVE TRANSMISSION STRUCTURE, ELECTROMAGNETIC WAVE TRANSMISSION STRUCTURE ARRAY, AND ELECTROMAGNETIC WAVE TRANSMISSION AND SHIFTING METHOD

BACKGROUND OF THE DISCLOSURE

1. Technical Field

This disclosure relates to a structure, an array, and a method. More particularly, the disclosure relates to an electromagnetic wave transmission structure, an electromagnetic wave transmission structure array, and an electromagnetic wave transmission and shifting method.

2. Description of Related Art

Communication dead zones (or dark zones) or weak-signal zones tend to exist in a mobile communication system due to the short wavelengths and high losses of electromagnetic waves and due to blockage by buildings, trees, shop signs, furniture, and so on. One current solution is to install more base stations or repeaters, and in order to achieve optimal base station coverage, it is generally required that tens of thousands of small base stations or repeaters be densely deployed, which however is a huge, labor-intensive, and prohibitively expensive engineering project. Moreover, the base stations or repeaters themselves consume a large amount of electricity, require maintenance (which can be time-consuming and arduous), and may cause mental stress to those who live nearby.

BRIEF SUMMARY OF THE DISCLOSURE

An electromagnetic wave transmission structure, an electromagnetic wave transmission and shifting method, and an electromagnetic wave transmission structure array are disclosed herein to increase the energy of an electromagnetic wave along its transmission path, to change the radiation direction of the electromagnetic wave, and to thereby propagate the electromagnetic wave into a communication dead zone.

The electromagnetic wave transmission structure is adapted to cause convergence of an electromagnetic wave. The electromagnetic wave transmission structure includes a substrate and a transmission unit. The transmission unit is provided on the substrate. The transmission unit includes an annular metal plate. The annular metal plate has a weighted average inner radius and a weighted average outer radius each related to the wavelength of the electromagnetic wave, to a focal length defined as the distance between the electromagnetic wave transmission structure and a focal point defined as the point at which the electromagnetic wave converges, and to an incident distance defined as the distance between the source of the electromagnetic wave and the focal point. The plural inner radii and plural outer radii respectively of the entire inner and outer circumferences of the annular metal plate have the same trend of variation. The inner radii correspond respectively to a plurality of weights that are respectively related to the plural reference included angles formed between the inner radii and a reference axis passing through the center of the annular metal plate. The outer radii correspond respectively to a plurality of weights that are respectively related to the plural reference included angles formed between the outer radii and the reference axis.

Alternatively, the electromagnetic wave transmission structure adapted to cause convergence of an electromagnetic wave may include the substrate and transmission unit described below. The transmission unit is provided on the substrate and includes a plurality of annular metal plates. Each annular metal plate has a weighted average inner radius that is different from the weighted average inner radius of another annular metal plate. The annular metal plates are arranged at intervals around the same center. Each annular metal plate further has a weighted average outer radius, and the weighted average inner radius and the weighted average outer radius of each annular metal plate are each related to the order in which the annular metal plate is arranged with respect to the center, the wavelength of the electromagnetic wave, a focal length defined as the distance between the electromagnetic wave transmission structure and a focal point defined as the point at which the electromagnetic wave converges, and an incident distance defined as the distance between the source of the electromagnetic wave and the focal point. The plural inner radii and plural outer radii respectively of the entire inner and outer circumferences of each annular metal plate have the same trend of variation. The inner radii of each annular metal plate correspond respectively to a plurality of weights that are respectively related to the plural reference included angles formed between those inner radii and a reference axis passing through the center of the annular metal plates. The outer radii of each annular metal plate correspond respectively to a plurality of weights that are respectively related to the plural reference included angles formed between those outer radii and the reference axis. The electromagnetic wave transmission and shifting method includes the step of propagating an electromagnetic wave to either one of the electromagnetic wave transmission structures described above such that the electromagnetic wave is shifted by an angle after impinging on and before exiting the electromagnetic wave transmission structure, wherein the angle is between −25° and 25°. When the incident direction of the electromagnetic wave is parallel to a normal vector of the electromagnetic wave transmission structure, the electromagnetic wave is shifted by the aforesaid angle with respect to the normal vector after impinging on and before exiting the electromagnetic wave transmission structure. When the incident direction of the electromagnetic wave and the normal vector of the electromagnetic wave transmission structure form the aforesaid angle, the electromagnetic wave is shifted and thereby rendered parallel to the normal vector after impinging on and before exiting the electromagnetic wave transmission structure.

The electromagnetic wave transmission structure array includes a plurality of electromagnetic wave transmission structures of either configuration described above, with the substrate of each electromagnetic wave transmission structure wound into a cylindrical shape, with the electromagnetic wave transmission structures arranged along a reference circle whose center is defined by a reference point and whose radius is a distance related to the wavelength, and with each electromagnetic wave transmission structure forming an included angle with a reference coordinate axis.

BRIEF DESCRIPTION OF THE SEVERAL VIEWS OF THE DRAWINGS

FIG. 10 is a measurement diagram showing Y-Z plane field patterns that, measured in an anechoic chamber, correspond respectively to the transmitting antenna and the system mentioned above in relation to FIG. 9.

FIG. 14 is a simulation diagram showing gain-versus-angle variations of the system composed of the transmitting antenna and the electromagnetic wave transmission structure in FIG. 13 in the main beam direction of the system when the electromagnetic wave transmission structure is shifted by 0 mm/10 mm/20 mm/30 mm/40 mm/50 mm/60 mm in the negative Y-axis direction.

FIG. 30 schematically shows the ninth embodiment of this disclosure.

FIG. 31 is a simulation diagram showing gain-versus-angle variations of a system composed of a transmitting antenna and an electromagnetic wave transmission structure with octagonal/decagonal/dodecagonal annular metal plates in the X-Z plane and in the main beam direction of the system.

DETAILED DESCRIPTION OF THE DISCLOSURE

This disclosure provides an electromagnetic wave transmission structure and an electromagnetic wave transmission and shifting method that incorporate the foregoing technical features and whose main effects are demonstrated by the following embodiments.

Figure 1:
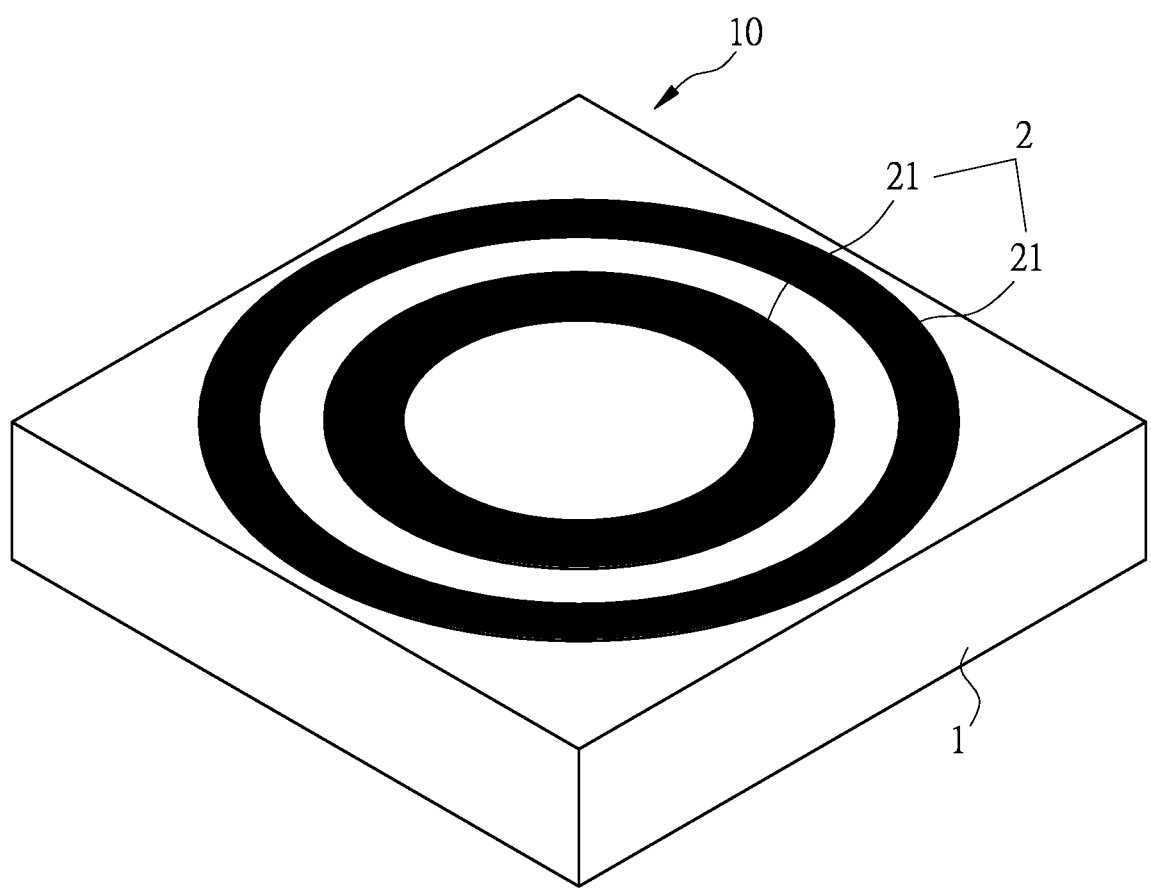
FIG. 1 is a perspective view of the first embodiment of this disclosure.
Figure 2:
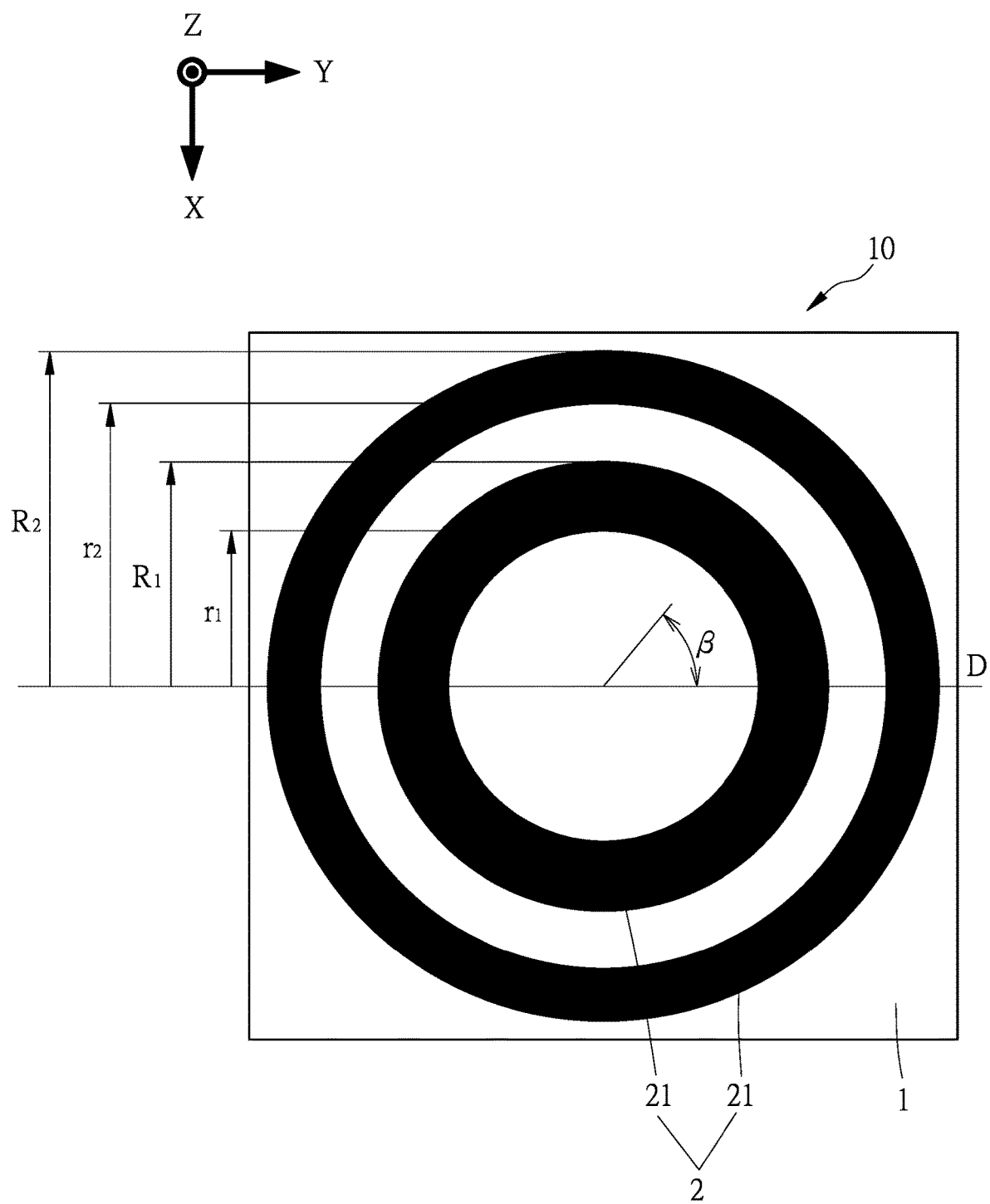
FIG. 2 is a top view of the first embodiment, showing in particular the transmission unit.
Figure 3:
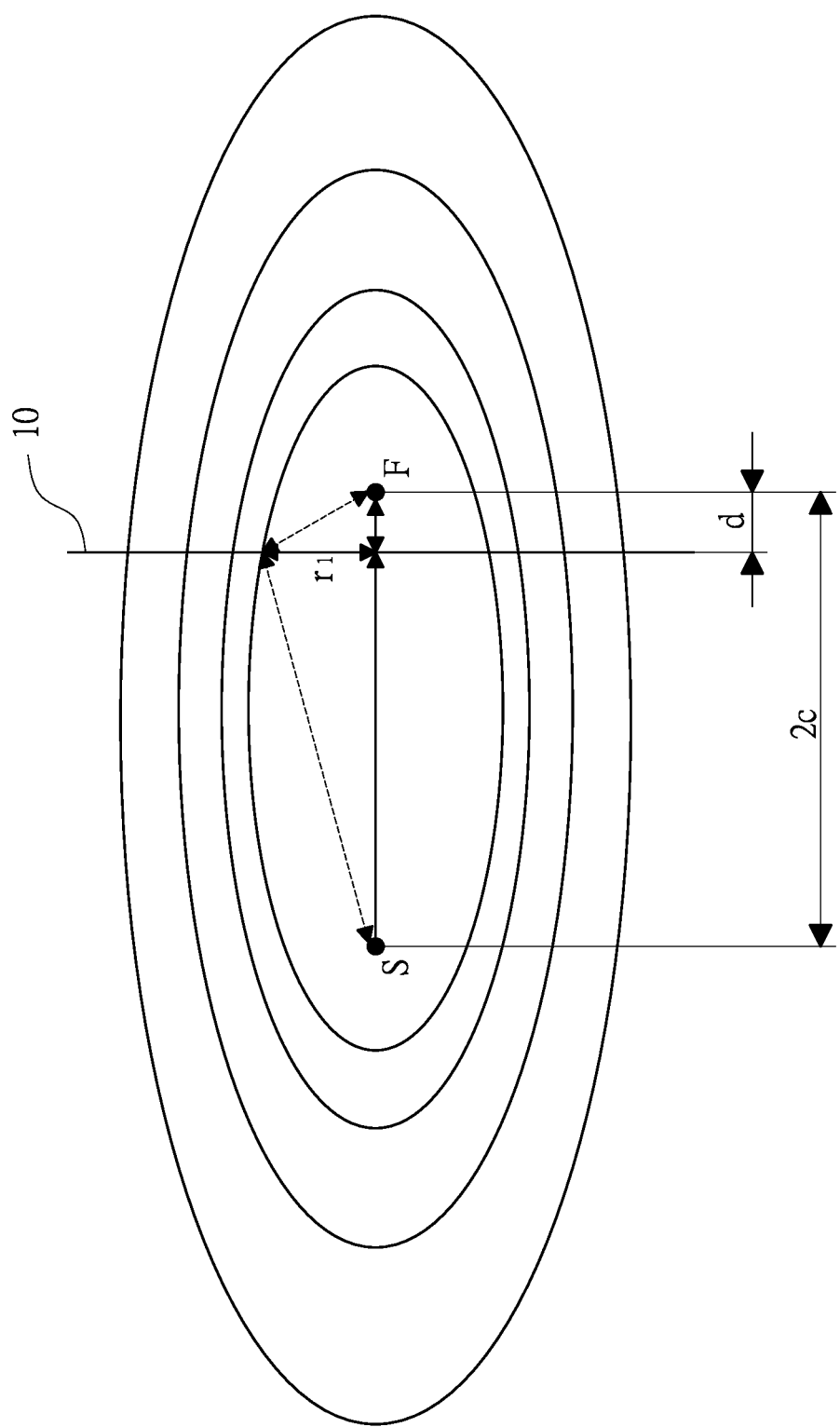
FIG. 3 schematically shows an electromagnetic wave impinging on the first embodiment and converging at a focal point.

Please refer to FIG. 1 to FIG. 3 for the first embodiment of this disclosure. The first embodiment is an electromagnetic wave transmission structure 10. The electromagnetic wave transmission structure 10 includes a substrate 1 and a transmission unit 2.

The transmission unit 2 is provided on the substrate 1. The substrate 1 is generally rectangular and is a rigid plate, wherein the rigid plate can be selected from a glass-reinforced hydrocarbon and ceramic laminated plate, a fiber-reinforced epoxy plate, a glass plate, and so on. In this embodiment, the substrate 1 is a high-frequency microwave plate, or more particularly a glass-reinforced hydrocarbon and ceramic laminated plate, and has a thickness of 0.508 mm. The transmission unit 2 includes a plurality of annular metal plates 21. The shape of each annular metal plate 21 is one selected from the group consisting of a circular shape, an elliptical shape, and a polygonal shape. In this embodiment, the annular metal plates 21 are circular, and each annular metal plate 21 has a weighted average inner radius different from the weighted average inner radius of another annular metal plate 21. The annular metal plates 21 are arranged at intervals around the same center. Each annular metal plate 21 further has a weighted average outer radius, and the weighted average inner radius and the weighted average outer radius of each annular metal plate 21 are each related to the order in which the annular metal plate 21 is arranged with respect to the center, the wavelength of an intended electromagnetic wave, a focal length defined as the distance between the electromagnetic wave transmission structure 10 and a focal point F defined as the point of convergence of the electromagnetic wave, and an incident distance defined as the distance between the source S of the electromagnetic wave and the focal point F. Moreover, the plural inner radii and plural outer radii respectively of the entire inner and outer circumferences of each annular metal plate 21 have the same trend of variation, and the inner radii of each annular metal plate 21 correspond respectively to a plurality of weights that are the same as the plurality of weights respectively to which the outer radii of the same annular metal plate 21 correspond. The weights of the inner radii of each annular metal plate 21 are respectively related to a plurality of reference included angles β that are formed between the inner radii and a reference axis D passing through the center. If the closer to the reference axis D an inner radius is, the greater the weight of the inner radius is preset to be, then the weight of each inner radius of each annular metal plate 21 can be defined as the absolute value of the cosine function of the reference included angle β. Conversely, if the farther away from the reference axis D an inner radius is, the greater the weight of the inner radius is preset to be, then the weight of each inner radius of each annular metal plate 21 can be defined as the absolute value of the sine function of the reference included angle β. Alternatively, the weights may be the absolute values of Euler's formula for the reference included angle β.

The electromagnetic wave transmission structure 10 is configured to carry out an electromagnetic wave transmission and shifting method, and the following positions are set before the electromagnetic wave transmission and shifting method is performed: a source position defined as the position of the source S of the electromagnetic wave, an installation position defined as the position where the electromagnetic wave transmission structure 10 is installed, and a focus position defined as the position of the focal point F, at which the electromagnetic wave converges after impinging on the electromagnetic wave transmission structure 10. The focal length and the incident distance are derived from the source position, the installation position, and the focus position. Each annular metal plate 21 has an inner radius function and an outer radius function that are related to the wavelength, the focal length, and the incident distance. The number of the annular metal plates 21 provided on the substrate 1 is preset according to the desired size of the electromagnetic wave transmission structure 10. In this embodiment, two annular metal plates 21 are provided by way of example.

The weighted average inner radius and the weighted average outer radius of each annular metal plate 21 are respectively equivalent to the function value of the following inner radius function and the function value of the following outer radius function:

$$\lambda_{ni} = \sqrt{\frac{\left(c^2 - cd - \left(\frac{(2n-1)\lambda}{4} + c\right)^2 - \left(\frac{(2n-1)\lambda}{4} + c\right)d\right)}{\left(c^2 - cd - \left(\frac{(2n-1)\lambda}{4} + c\right)^2 + \left(\frac{(2n-1)\lambda}{4} + c\right)d\right)}}{\left(\frac{(2n-1)\lambda}{4} + c\right)^2}}$$

$$\lambda_{no} = \sqrt{\frac{\left(c^2 - cd - \left(\frac{2n\lambda}{4} + c\right)^2 - \left(\frac{2n\lambda}{4} + c\right)d\right)}{\left(c^2 - cd - \left(\frac{2n\lambda}{4} + c\right)^2 + \left(\frac{2n\lambda}{4} + c\right)d\right)}}{\left(\frac{2n\lambda}{4} + c\right)^2}}$$

where $h_{ni}$ is the inner radius function of the $n^{th}$ annular metal plate 21, $h_{no}$ is the outer radius function of the $n^{th}$ annular metal plate 21, n indicates the $n^{th}$ annular metal plate 21 that is sequentially arranged outward from the center, c is one half of the incident distance, d is the focal length, and λ is the wavelength. Based on the inner dimeter function, the outer radius function, and the preset wavelength, focal length, and incident distance, the function values corresponding respectively to the weighted average inner radius and the weighted average outer radius of each annular metal plate 21 can be determined. The weighted average inner radius and the weighted average outer radius of each annular metal plate 21 can then be used to establish equations for the inner radii and outer radii of the annular metal plate 21 respectively, thereby determining the configuration of the annular metal plate 21.

In this embodiment, each annular metal plate 21 is of a circular shape. To establish an equation for the inner radii of the first annular metal plate 21 for example, it is preset that the reference axis D is the Y-Z plane; that the farther away from the reference axis D an inner radius is, the greater the weight of the inner radius will be; and that therefore the weight of each inner radius of the first annular metal plate 21 is defined as the absolute value of the sine function of the reference included angle β.

The inner circumference of the first annular metal plate 21 can be expressed by the following equation:

$$x^2 + y^2 = r_1^2$$

where (x,y) represents the coordinates of the inner circumference of the first annular metal plate 21 in the X-Y plane, and $r_1$ represents the inner radius of the first annular metal plate 21.

The inner radius $r_1$ of the first annular metal plate 21 is the parameter to be determined in this example. As stated above, the function value $h_{1i}$ of the inner radius function of the first annular metal plate 21 is equivalent to the weighted average inner radius of the first annular metal plate 21, and given the preset parameters in this example, the function value $h_{1i}$ of the inner radius function of the first annular metal plate 21 is a known parameter:

$$h_{1f} = \frac{\int_0^{2\pi} r_1 |\sin\beta| d\beta}{\int_0^{2\pi} |\sin\beta| d\beta} = \frac{\int_0^{\frac{\pi}{2}} r_1 \sin\beta d\beta + \int_{\frac{\pi}{2}}^{\pi} r_1 \sin\beta d\beta - \int_{\pi}^{\frac{3\pi}{2}} r_1 \sin\beta d\beta - \int_{\frac{3\pi}{2}}^{2\pi} r_1 \sin\beta d\beta}{\int_0^{\frac{\pi}{2}} \sin\beta d\beta + \int_{\frac{\pi}{2}}^{\pi} \sin\beta d\beta - \int_{\pi}^{\frac{3\pi}{2}} \sin\beta d\beta - \int_{\frac{3\pi}{2}}^{2\pi} \sin\beta d\beta} = \frac{4r_1}{4} = r_1$$

According to the above equation, each inner radius $r_1$ of the first annular metal plate 21 is equal to the weighted average inner radius of the first annular metal plate 21. It can therefore be inferred that when each annular metal plate 21 is circular, each inner radius and each outer radius of each annular metal plate 21 are equal to the weighted average inner radius and the weighted average outer radius of the annular metal plate 21 respectively. Each outer radius $R_1$ of the first annular metal plate 21 and each inner radius $r_2$ and each outer radius $R_2$ of the second annular metal plate 21 can be determined in the same way.

Figure 4:
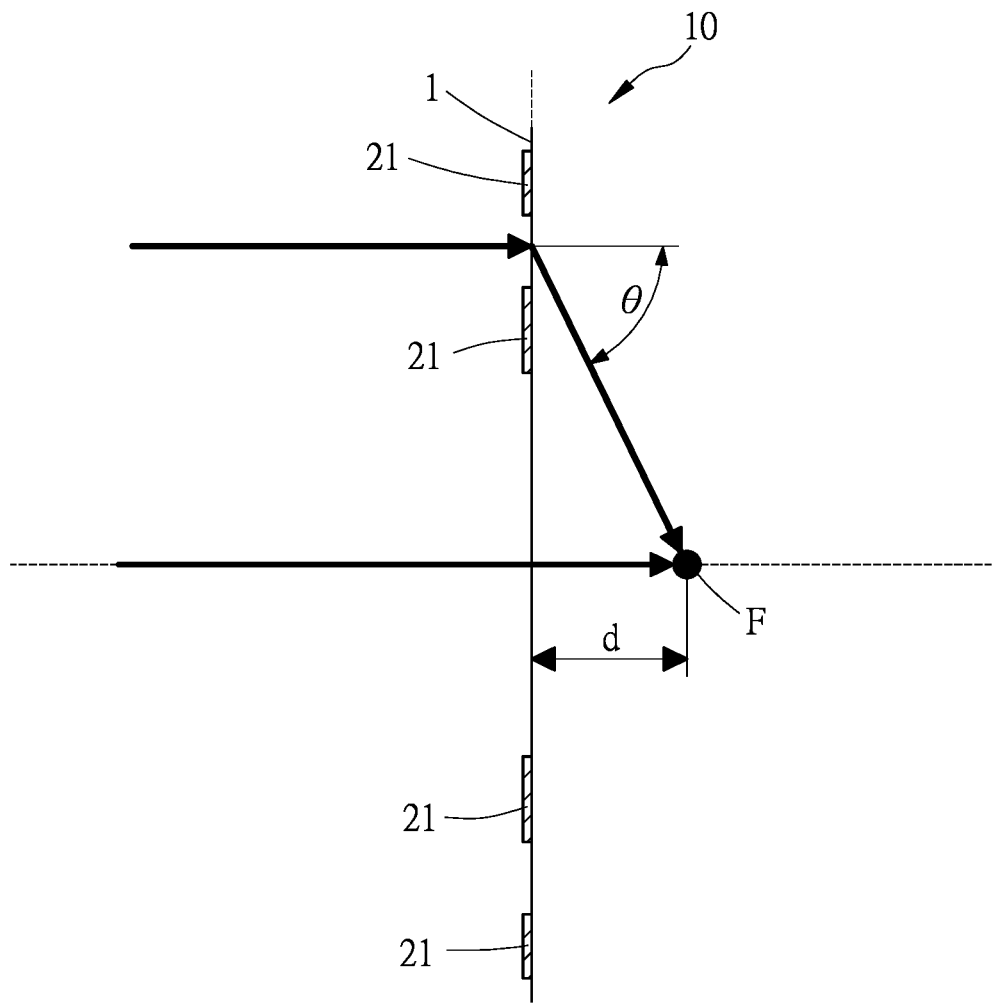
FIG. 4 is another schematic drawing showing the electromagnetic wave impinging on the first embodiment and converging at the focal point.

Referring to FIG. 1, FIG. 3, and FIG. 4, the electromagnetic wave impinges on the electromagnetic wave transmission structure 10 perpendicularly, i.e., the incident direction of the electromagnetic wave is parallel to a normal vector of the electromagnetic wave transmission structure 10. Some of the electromagnetic wave impinging on the electromagnetic wave transmission structure 10 passes through the gap between the annular metal plates 21 while some of the electromagnetic wave impinging on the electromagnetic wave transmission structure 10 is reflected by the annular metal plates 21. Thus, the electromagnetic wave transmission structure 10 on one hand allows those portions of the incident electromagnetic wave that have similar phases to pass and on the other hand reflects those portions of the incident electromagnetic wave that have the opposite phase. In other words, the electromagnetic wave transmission structure 10 on one hand allows those portions of the incident electromagnetic wave whose phase difference contributes to constructive interference to pass and on the other hand reflects those portions of the incident electromagnetic wave whose phase difference contributes to destructive interference. Consequently, the energy of the electromagnetic wave converges, and an increased gain is achieved for the electromagnetic wave impinging on the electromagnetic wave transmission structure 10. In addition, the electromagnetic wave is shifted by an angle θ with respect to the normal vector after impinging on and before exiting the electromagnetic wave transmission structure 10, wherein the angle θ is between −25° and 25°. It should be pointed out that the gain is reduced by less than 3 dBi when the electromagnetic wave is shifted by the angle θ before exiting the electromagnetic wave transmission structure 10, wherein dBi is a unit of gain. It is also worth mentioning that propagation of the electromagnetic wave is reciprocal; therefore, if the incident direction of the electromagnetic wave forms the angle θ with the normal vector of the electromagnetic wave transmission structure 10, the electromagnetic wave will exit the electromagnetic wave transmission structure 10 parallel to the normal vector after impinging on, and as a result of being shifted by, the electromagnetic wave transmission structure 10. Thus, an existing communication dead zone concerning the electromagnetic wave can be easily eliminated by installing the electromagnetic wave transmission structure 10 at a position where the electromagnetic wave transmission structure 10 can shift the electromagnetic wave and thereby propagate the electromagnetic wave into the communication dead zone.

Figure 5:
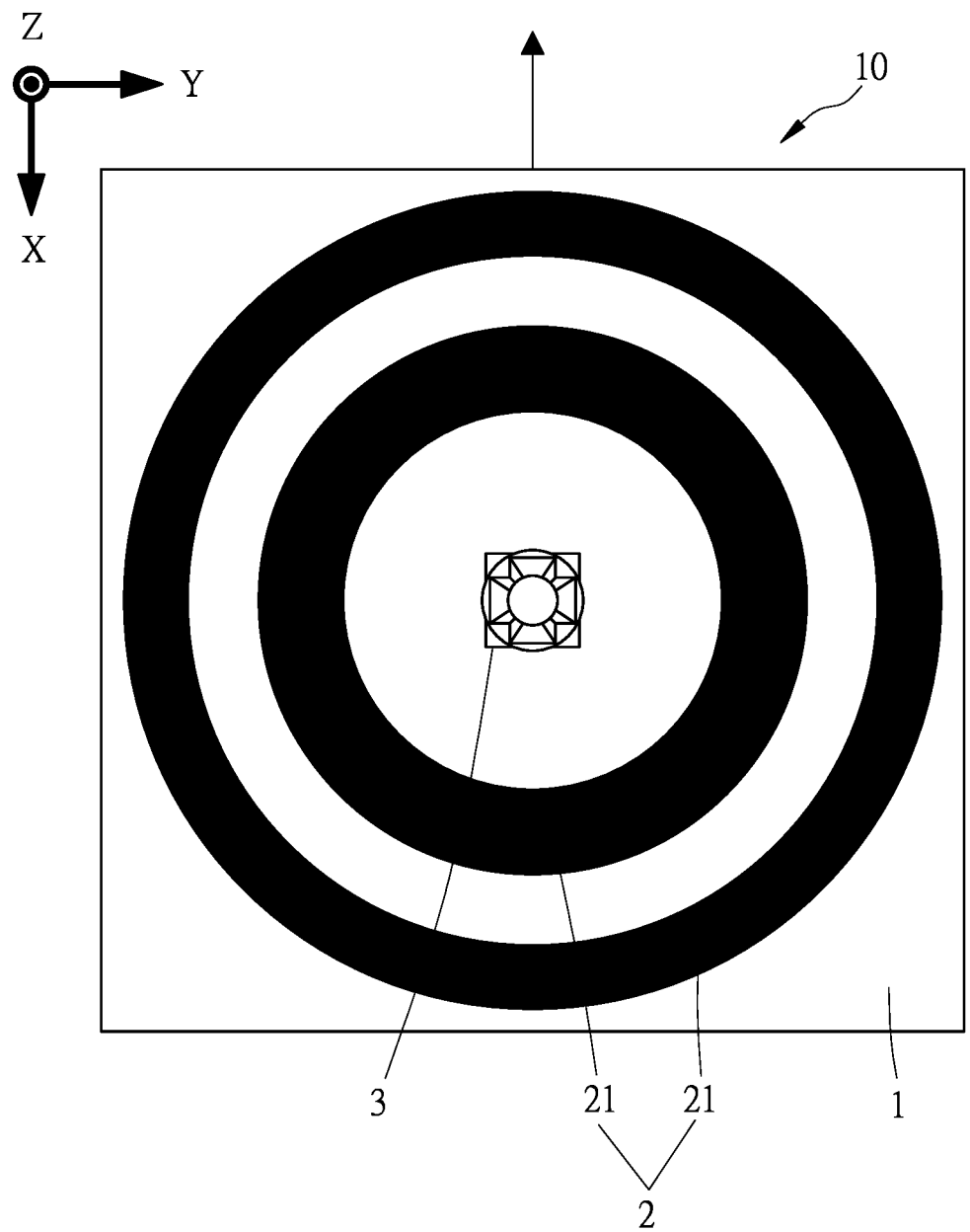
FIG. 5 is a simulation diagram showing how the electromagnetic wave transmission structure in FIG. 1 is shifted by 0 mm/20 mm/40 mm in the negative X-axis direction, with a receiving antenna receiving the electromagnetic wave exiting the electromagnetic wave transmission structure.
Figure 6:
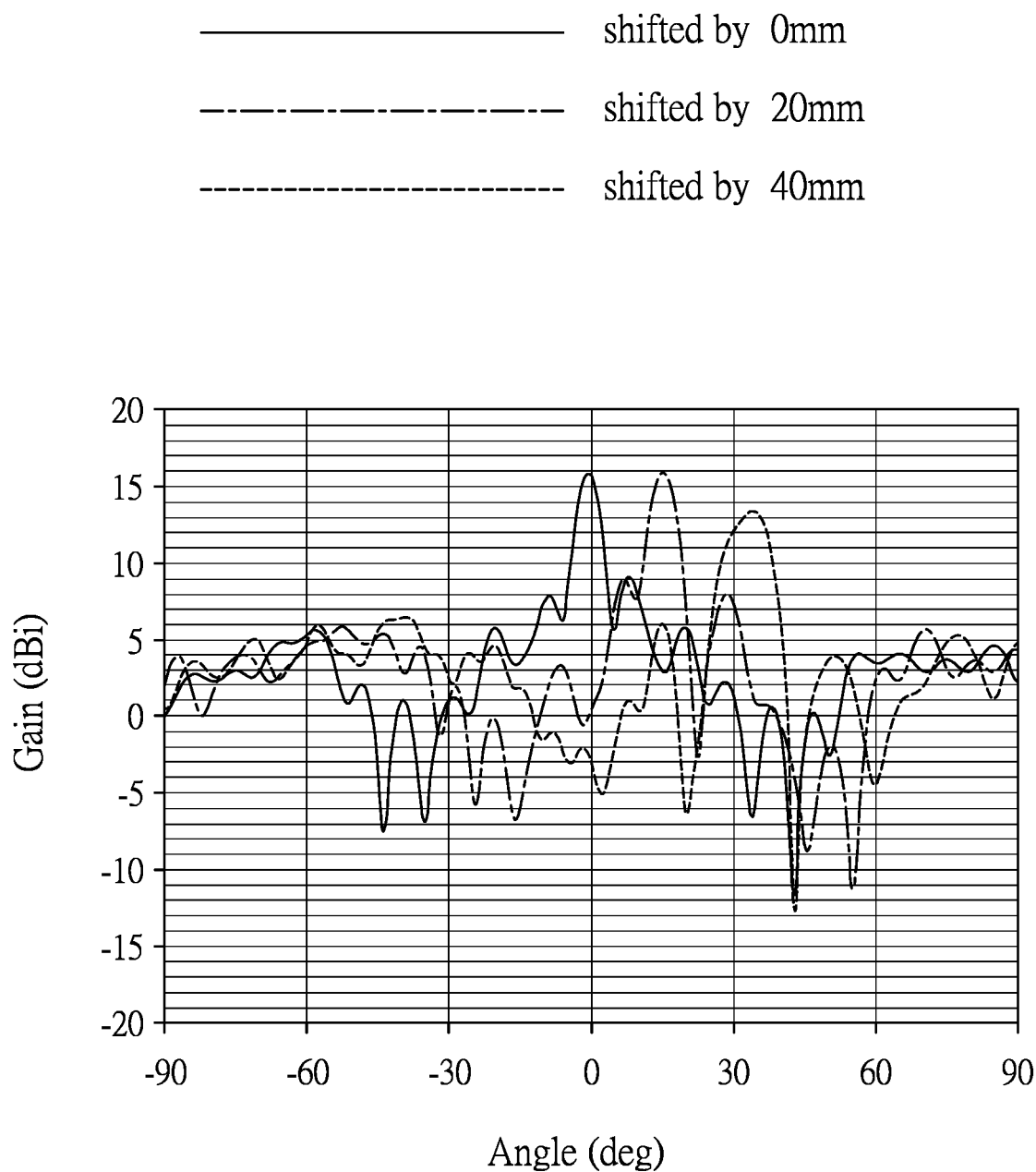
FIG. 6 is a simulation diagram showing gain-versus-angle variations of a system composed of a transmitting antenna and the electromagnetic wave transmission structure in FIG. 5 in the X-Z plane and in the main beam direction of the system when the electromagnetic wave transmission structure is shifted by 0 mm/20 mm/40 mm in the negative X-axis direction.

In one simulation example, referring to FIG. 5 and FIG. 6, a bowtie antenna is used as the transmitting antenna 3, the electromagnetic wave transmission structure 10 and the transmitting antenna 3 are both installed parallel to the X-Y plane and are spaced apart in the Z-axis direction, and the electromagnetic wave has a frequency of 28 GHz. The wavelength λ is calculated from the frequency of the electromagnetic wave. The distance between the electromagnetic wave transmission structure 10 and the transmitting antenna 3 is set at five times the wavelength λ. The focal length is set at 100 times the wavelength λ. The inner radii and outer radii of the annular metal plates 21 are derived from the foregoing parameters, and the electromagnetic wave transmission structure 10 is simulated using the dimensions obtained.

The electromagnetic wave impinges on the electromagnetic wave transmission structure 10 perpendicularly after the electromagnetic wave transmission structure 10 is shifted in the negative X-axis direction. When the electromagnetic wave transmission structure 10 is shifted by 0 mm, the angle θ is 0°, and the system formed by the bowtie antenna and the electromagnetic wave transmission structure 10 has a gain of 17.3 dBi in the main beam direction. When the electromagnetic wave transmission structure 10 is shifted by 20 mm, the angle θ is 16°, the main beam direction of the system is changed to 16°, and the gain of the system in the main beam direction is reduced to 16 dBi. When the electromagnetic wave transmission structure 10 is shifted by 28 mm, the angle θ is 22°, the main beam direction of the system is changed to 22°, and the gain of the system in the main beam direction is reduced to 14.45 dBi, with the gain reduction being less than 3 dBi. As the electromagnetic wave transmission structure 10 is a symmetric structure, shifting the electromagnetic wave transmission structure 10 in the positive X-axis direction produces the same results as shifting the electromagnetic wave transmission structure 10 in the negative X-axis direction.

Figure 7:
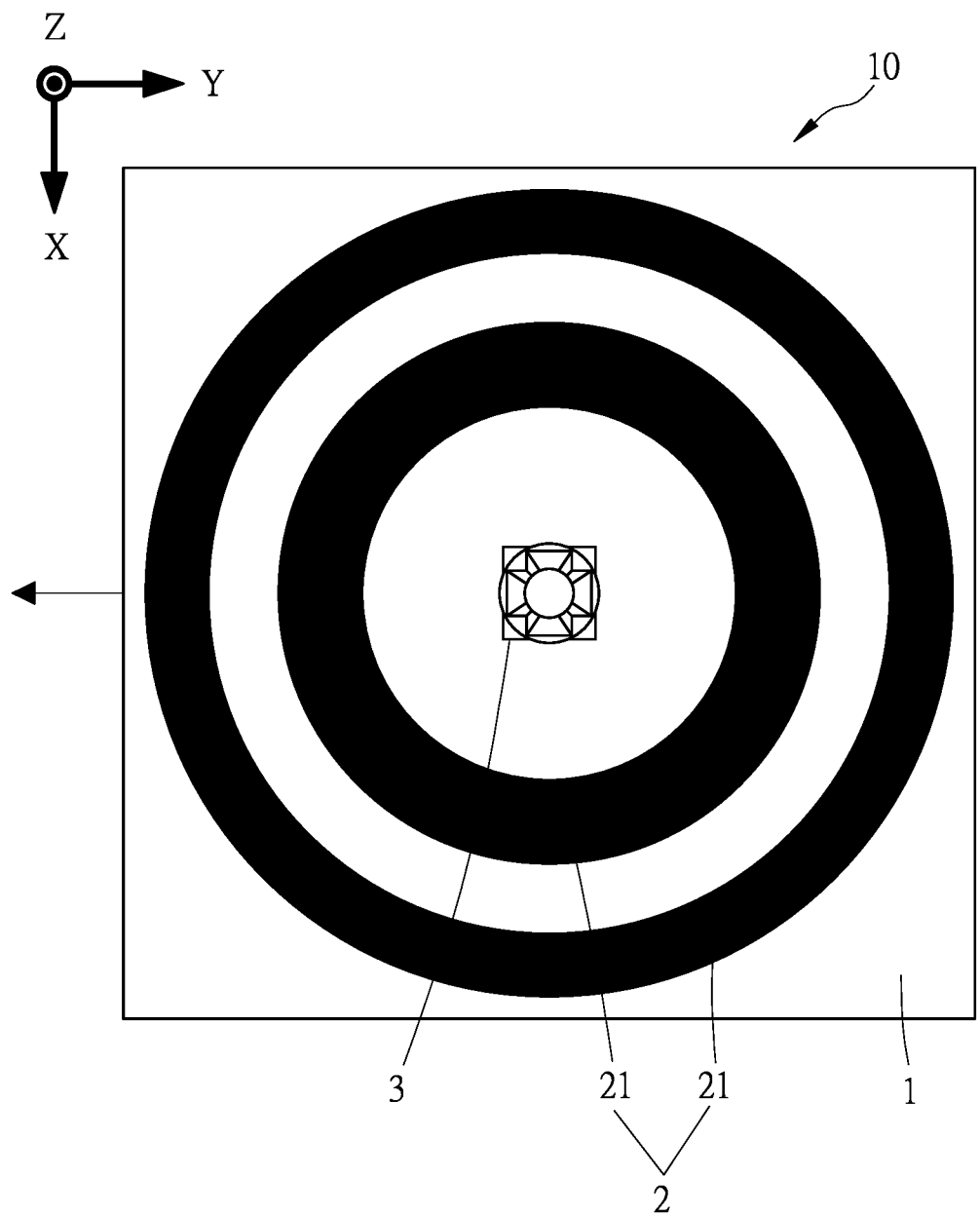
FIG. 7 is a simulation diagram showing how the electromagnetic wave transmission structure in FIG. 5 is shifted by 0 mm/20 mm/40 mm in the negative Y-axis direction, with the receiving antenna receiving the electromagnetic wave exiting the electromagnetic wave transmission structure.
Figure 8:
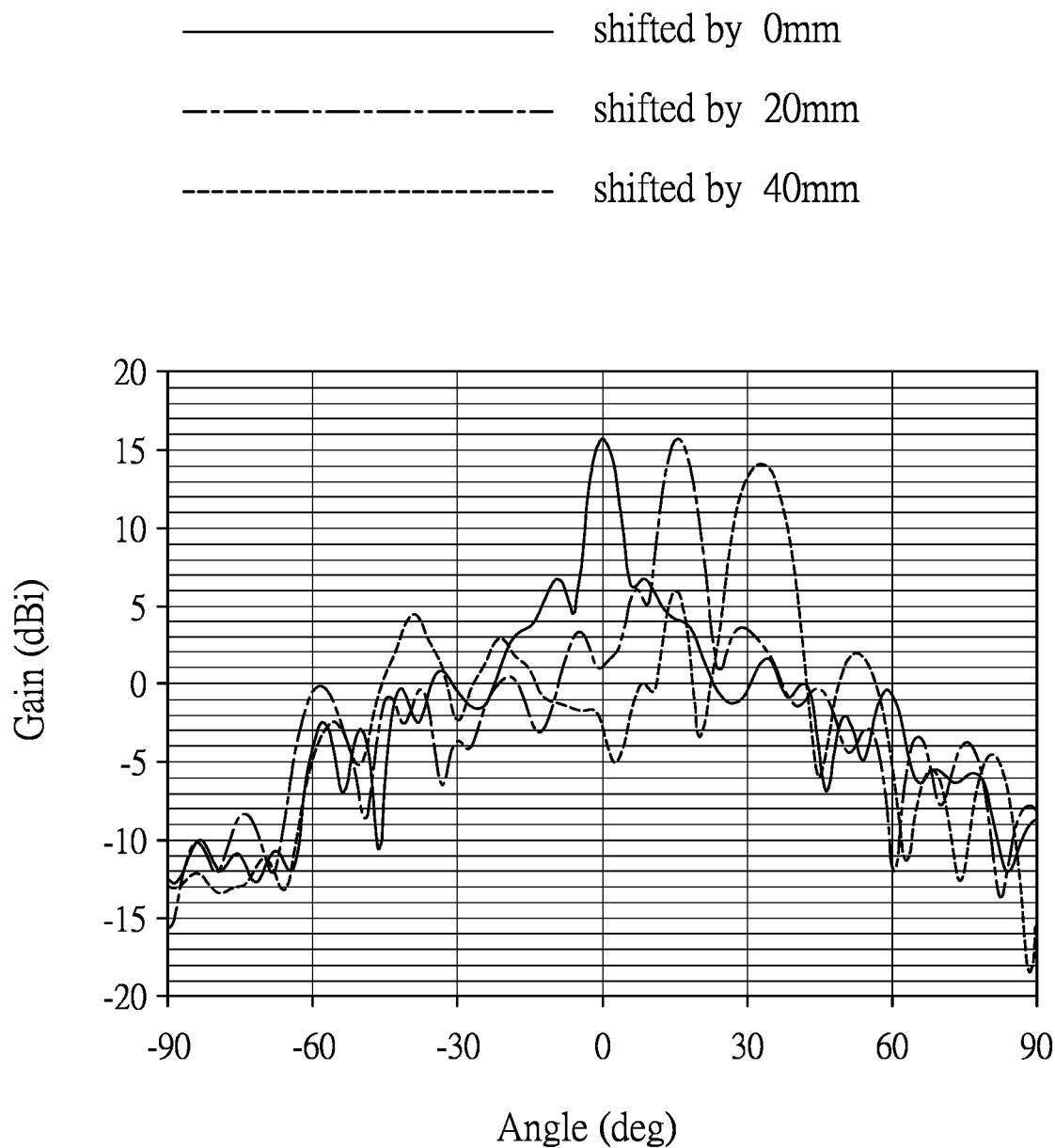
FIG. 8 is a simulation diagram showing gain-versus-angle variations of the system composed of the transmitting antenna and the electromagnetic wave transmission structure in FIG. 7 in the Y-Z plane and in the main beam direction of the system when the electromagnetic wave transmission structure is shifted by 0 mm/20 mm/40 mm in the negative Y-axis direction.

Referring to FIG. 7 and FIG. 8, the electromagnetic wave transmission structure 10 is shifted in the negative Y-axis direction. When the electromagnetic wave transmission structure 10 is shifted by 0 mm, the angle θ is 0°, and the system has a gain of 17.3 dBi in the main beam direction. When the electromagnetic wave transmission structure 10 is shifted by 20 mm, the angle θ is 16°, the main beam direction of the system is changed to 16°, and the gain of the system in the main beam direction is reduced to 16.2 dBi. When the electromagnetic wave transmission structure 10 is shifted by 30 mm, the angle θ is 25°, the main beam direction of the system is changed to 25°, and the gain of the system in the main beam direction is reduced to 14.5 dBi, with the gain reduction being less than 3 dBi. As the electromagnetic wave transmission structure 10 is a symmetric structure, the results of shifting the electromagnetic wave transmission structure 10 in the positive Y-axis direction are similar to those of shifting the electromagnetic wave transmission structure 10 in the negative Y-axis direction. As can be seen in the gain diagrams of the system, the system has a larger beam scanning area but also a greater gain reduction when the shifting distance of the electromagnetic wave transmission structure 10 is increased.

It is worth mentioning that the transmission unit 2 may include only one annular metal plate 21 and therefore occupy a smaller area; that is to say, the overall volume of the electromagnetic wave transmission structure 10 can be reduced as needed. However, the gain associated with the electromagnetic wave impinging on only one annular metal plate 21 will be less than when more annular metal plates 21 are used.

Figure 9:
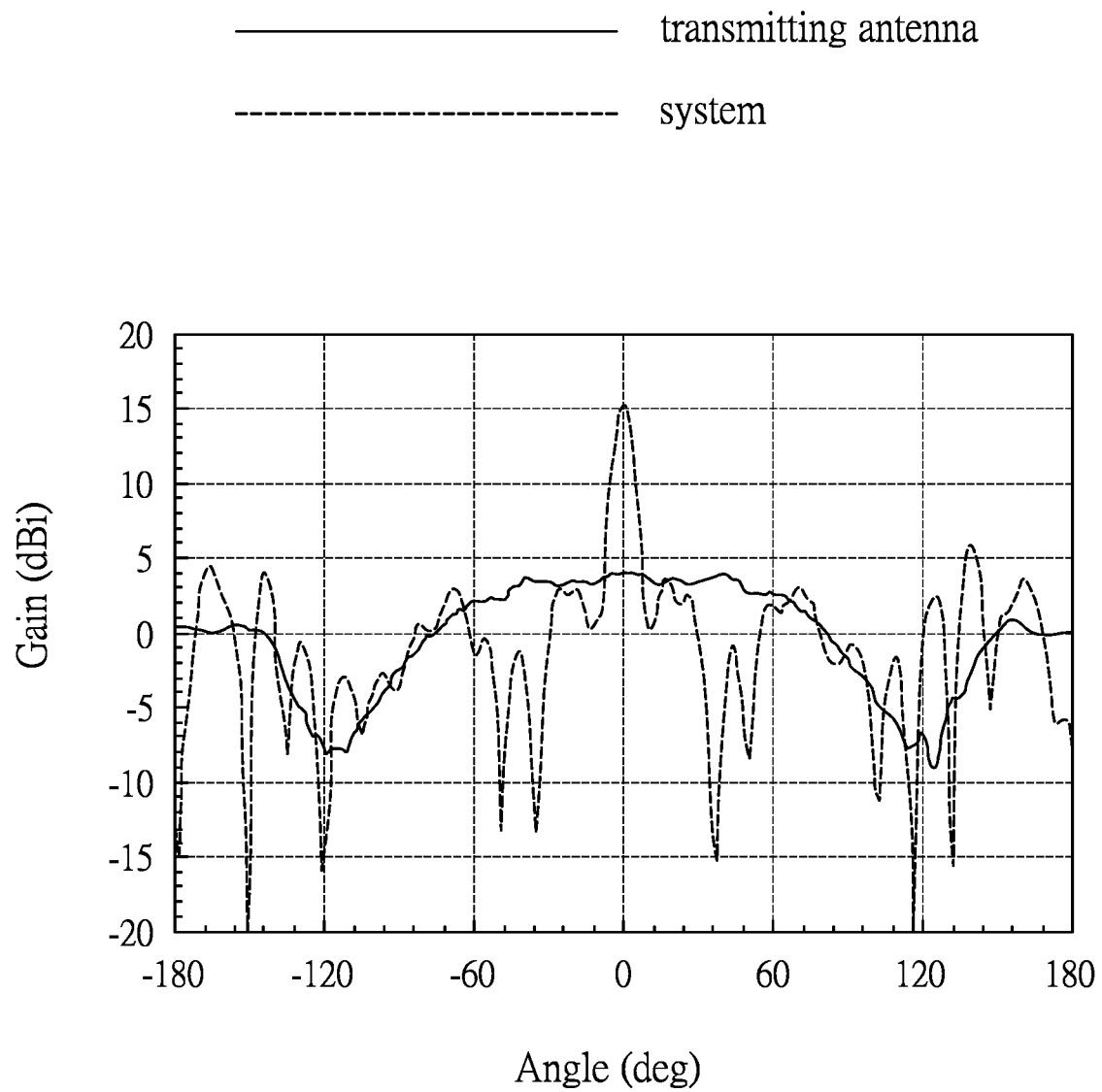
FIG. 9 is a measurement diagram showing X-Z plane field patterns that, measured in an anechoic chamber, correspond respectively to a transmitting antenna and a system composed of the transmitting antenna and a variant of the electromagnetic wave transmission structure in FIG. 5.
Figure 11:
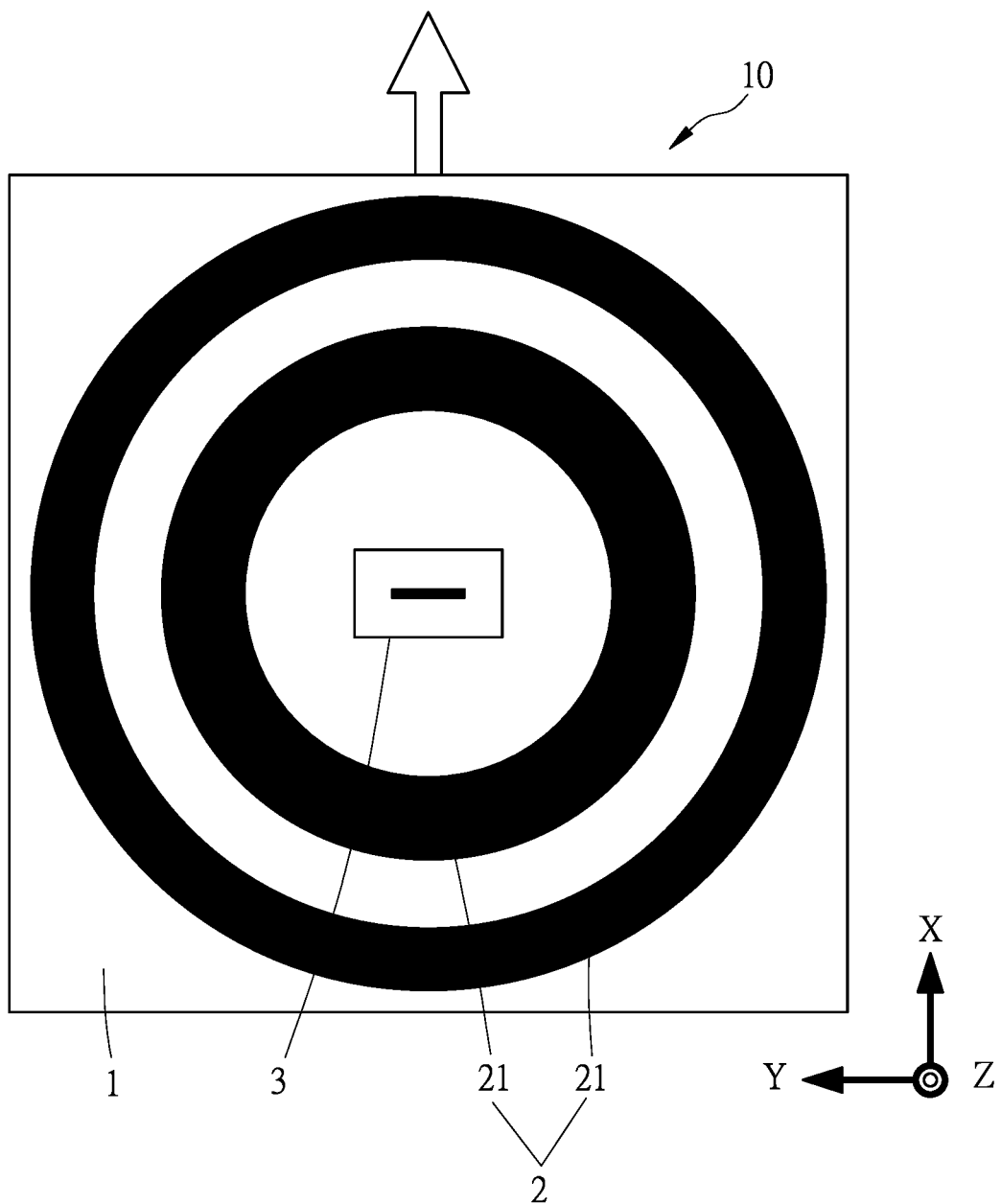
FIG. 11 is a simulation diagram showing how the aforesaid variant of the electromagnetic wave transmission structure in FIG. 5 is shifted by 0 mm/10 mm/20 mm/30 mm/40 mm/50 mm/60 mm in the positive X-axis direction, with a receiving antenna receiving the electromagnetic wave exiting the electromagnetic wave transmission structure.

Referring to FIG. 9, FIG. 10, and FIG. 11 for a variant of the electromagnetic wave transmission structure 10, the substrate 1 in this variant is a 0.254 mm-thick fiber-reinforced epoxy plate, the frequency of the electromagnetic wave is 28 GHz, and the distance between the electromagnetic wave transmission structure 10 and the transmitting antenna 3 is three times the wavelength λ. The electromagnetic wave transmission structure 10 is placed in an anechoic chamber for measurement. FIG. 9 shows the X-Z plane field patterns obtained, and FIG. 10 shows the Y-Z plane field patterns obtained. As can be seen in the measurement diagrams, the system formed by the electromagnetic wave transmission structure 10 and the transmitting antenna 3 exhibits an increase of gain of 11.2 dBi over the gain of the transmitting antenna 3, and the half-power beam width (the 3 dBi beam width) is reduced to 10°.

Figure 12:
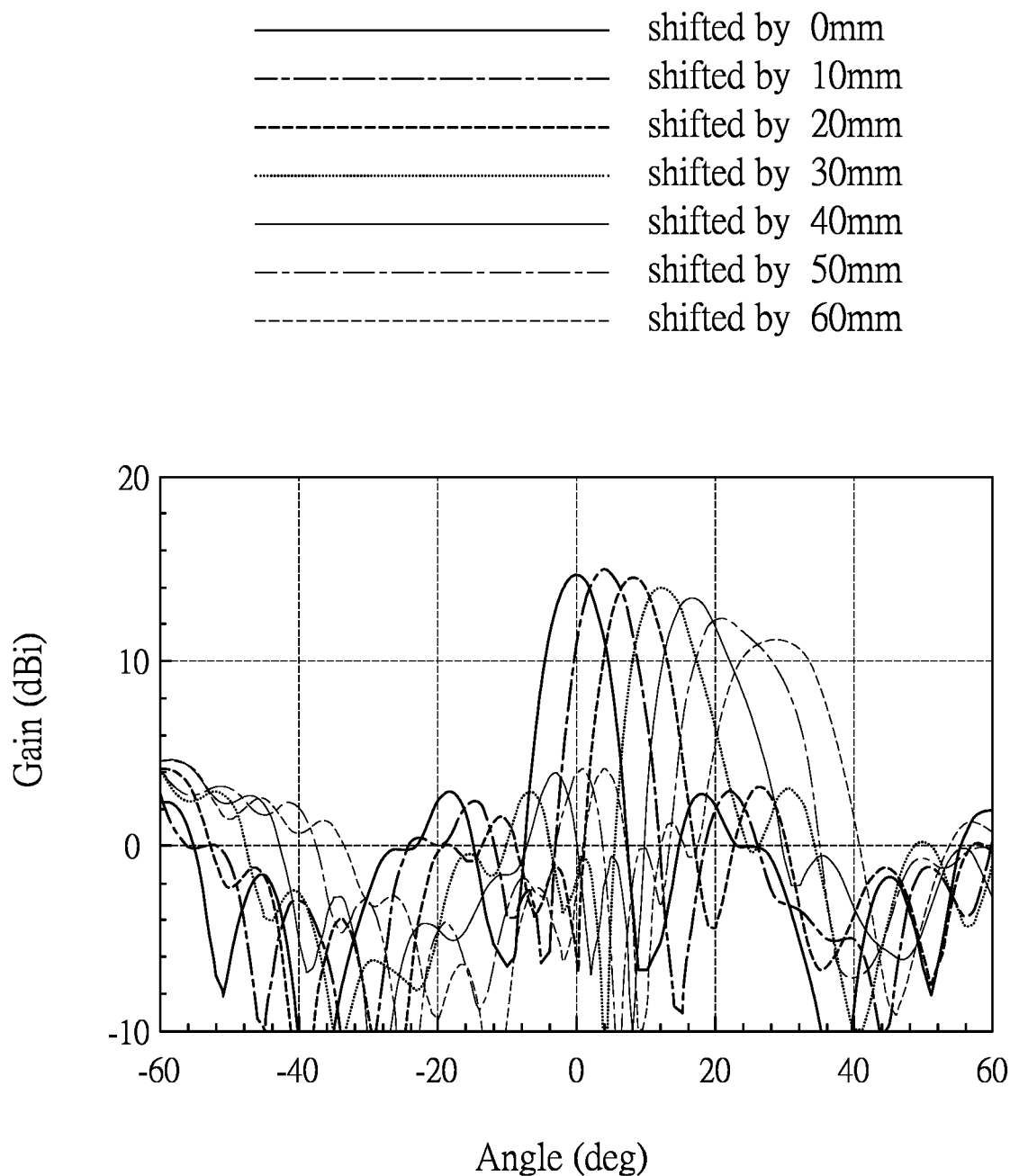
FIG. 12 is a simulation diagram showing gain-versus-angle variations of the system composed of the transmitting antenna and the electromagnetic wave transmission structure in FIG. 11 in the main beam direction of the system when the electromagnetic wave transmission structure is shifted by 0 mm/10 mm/20 mm/30 mm/40 mm/50 mm/60 mm in the positive X-axis direction.

Referring to FIG. 11 and FIG. 12, a simulation is performed on the electromagnetic wave transmission structure 10 in FIG. 11. The electromagnetic wave transmission structure 10 and the transmitting antenna 3 are both installed parallel to the X-Y plane and are spaced apart in the Z-axis direction, and the electromagnetic wave transmission structure 10 is shifted in the positive X-axis direction. It has been found that the field pattern of the system shows a more marked variation when the shifting distance of the electromagnetic wave transmission structure 10 is increased, and that the gain of the system is reduced when the distance between the electromagnetic wave transmission structure 10 and the center of the receiving antenna is increased. When the electromagnetic wave transmission structure 10 is not shifted, the gain of the system is 14.6 dBi, and the main beam direction of the system is 0°. When the electromagnetic wave transmission structure 10 is shifted by 60 mm, the gain of the system is 11.1 dBi, and the main beam direction of the system is changed from 0° to 29°. It can be clearly seen that the system has a larger beam scanning area but also a greater gain reduction when the shifting distance of the electromagnetic wave transmission structure 10 is increased.

Figure 13:
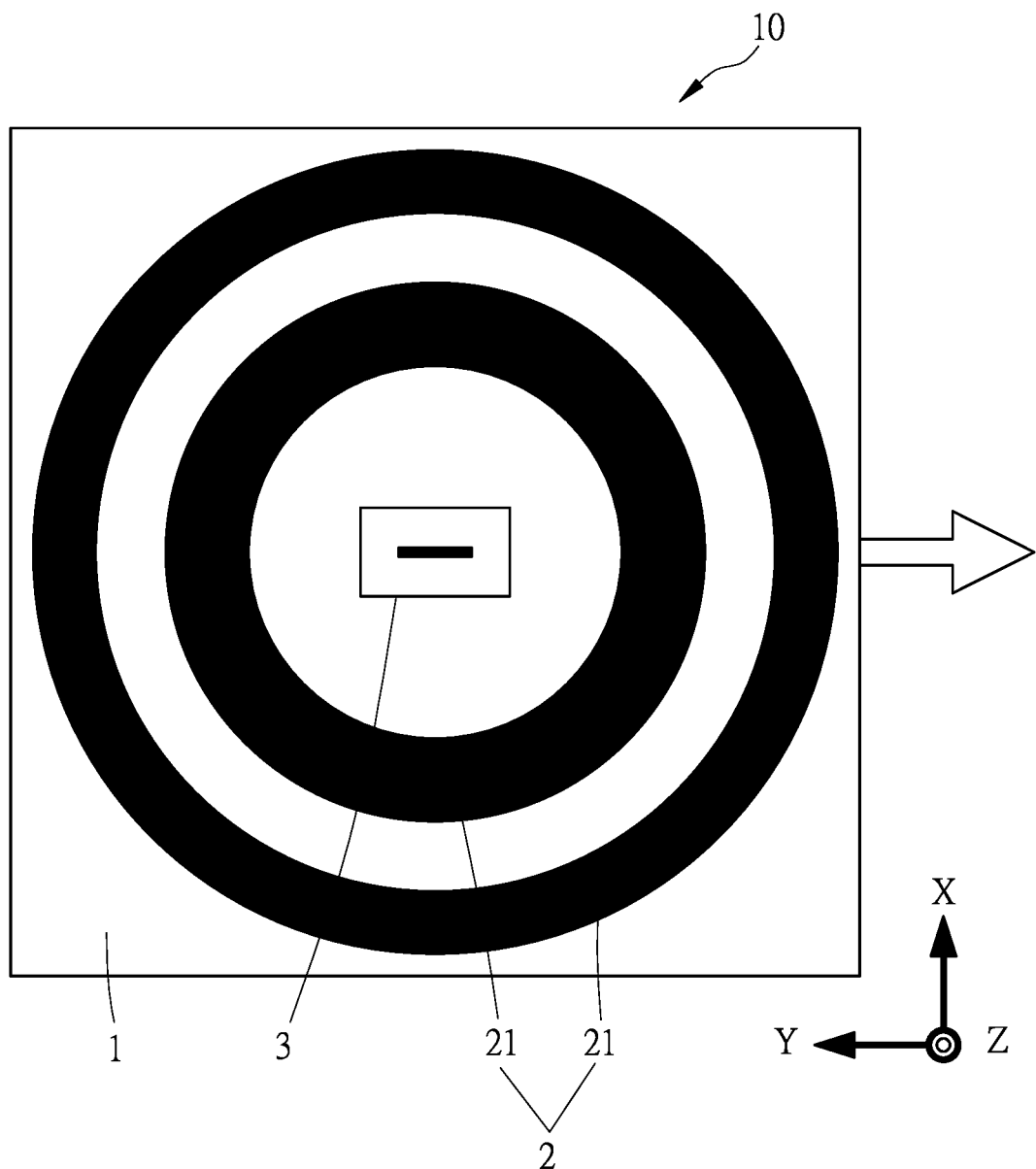
FIG. 13 is a simulation diagram showing how the electromagnetic wave transmission structure in FIG. 11 is shifted by 0 mm/10 mm/20 mm/30 mm/40 mm/50 mm/60 mm in the negative Y-axis direction, with the receiving antenna receiving the electromagnetic wave exiting the electromagnetic wave transmission structure.

Referring to FIG. 13 and FIG. 14, as the electromagnetic wave transmission structure 10 is a symmetric structure, the results of shifting the electromagnetic wave transmission structure 10 in the negative Y-axis direction are similar to those of shifting the electromagnetic wave transmission structure 10 in the positive X-axis direction. For example, when the electromagnetic wave transmission structure 10 is shifted by 60 mm in the negative Y-axis direction, the gain of the system is 12 dBi, and the main beam direction of the system is changed from 0° to 26°.

Figure 15:
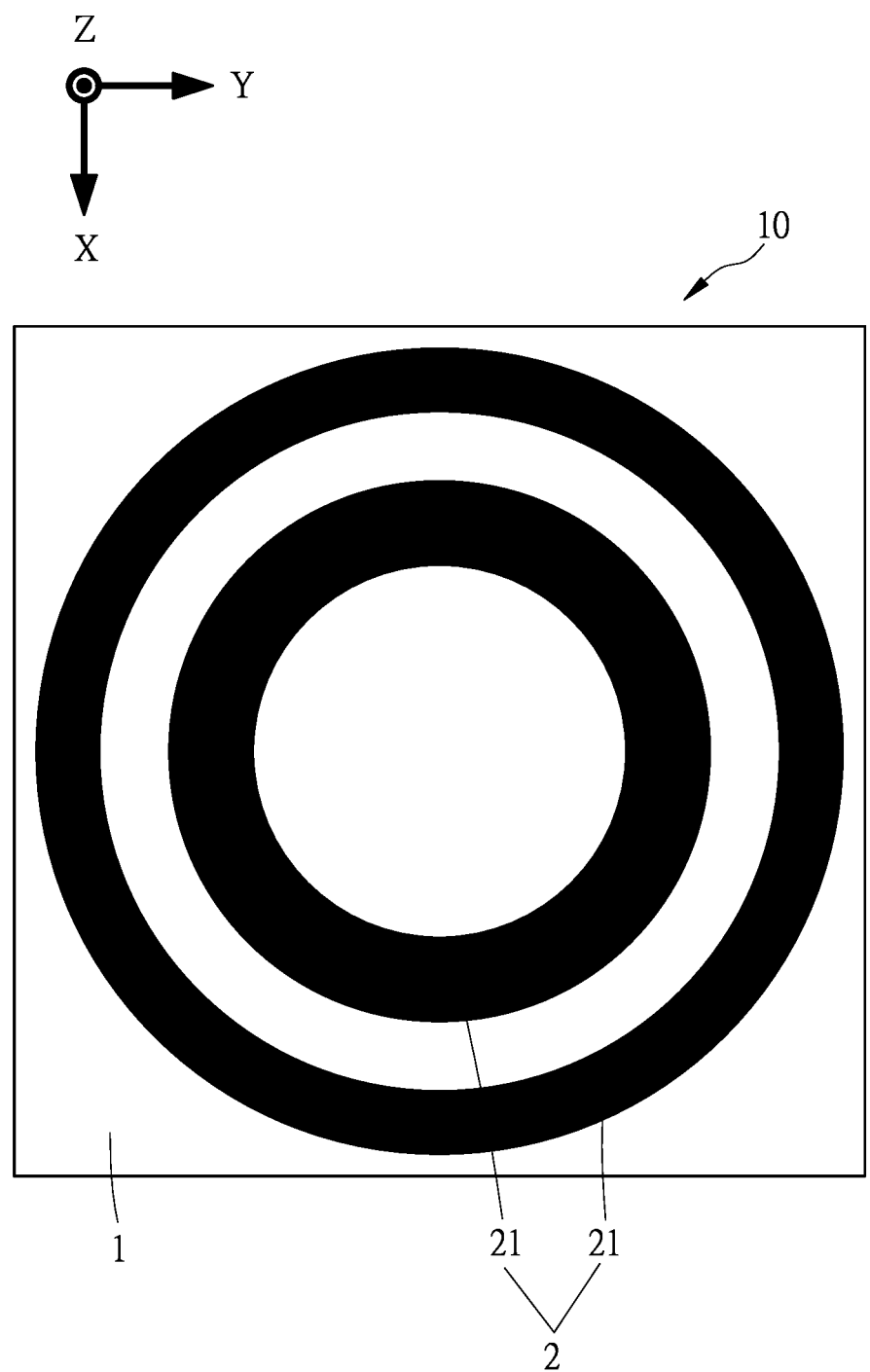
FIG. 15 is a top view of the second embodiment of this disclosure.
Figure 16:
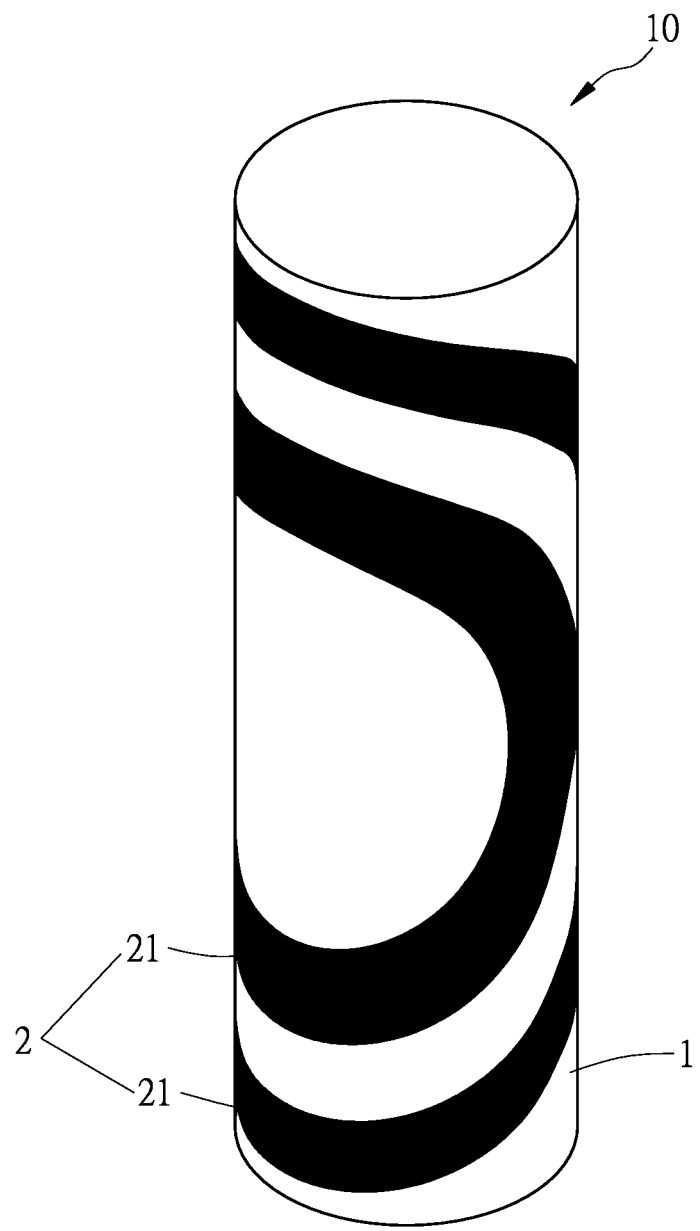
FIG. 16 schematically shows the second embodiment in a curved state.
Figure 17:
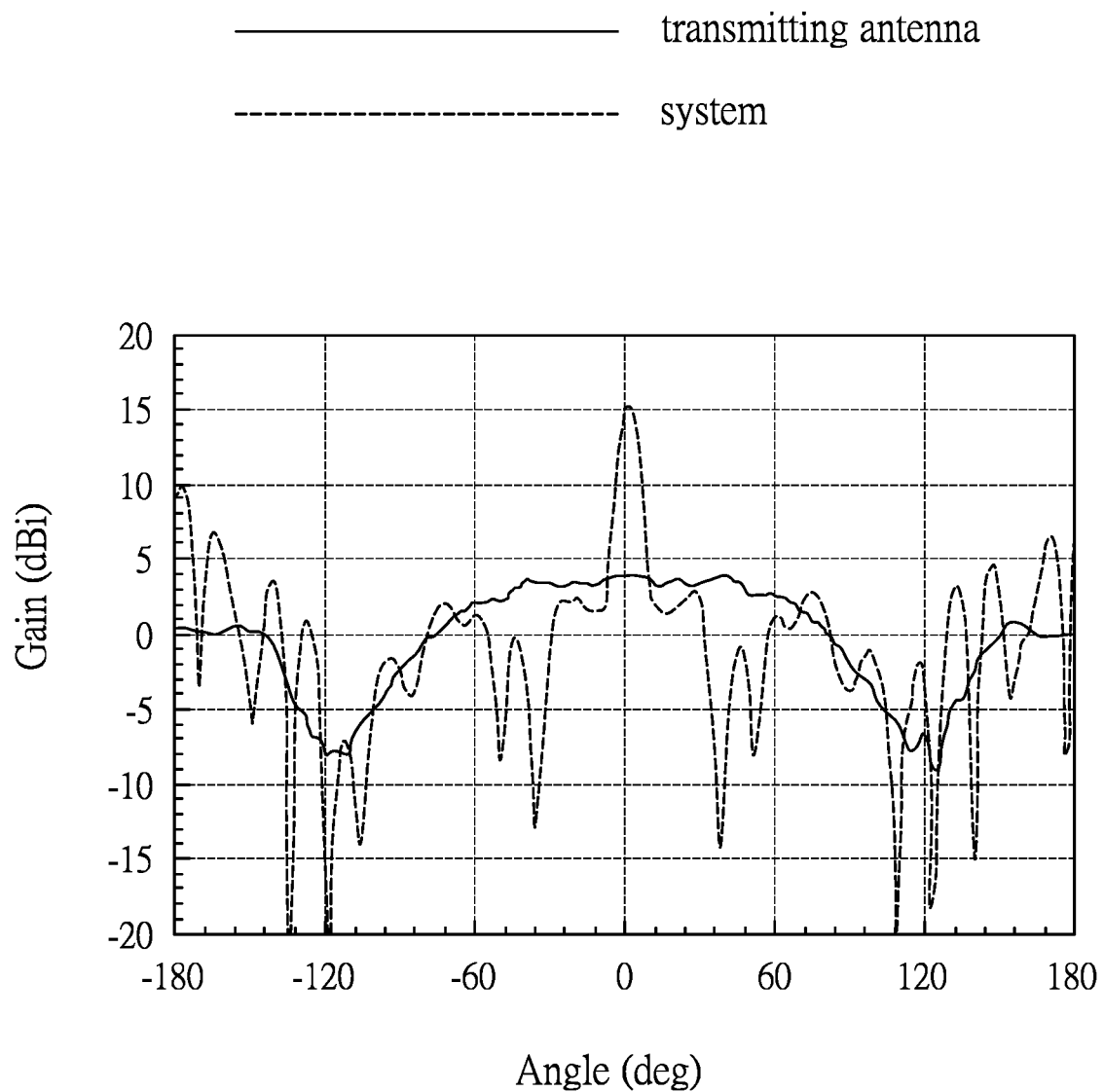
FIG. 17 is a measurement diagram showing X-Z plane field patterns that, measured in an anechoic chamber, correspond respectively to a transmitting antenna and a system composed of the transmitting antenna and the second embodiment.
Figure 18:
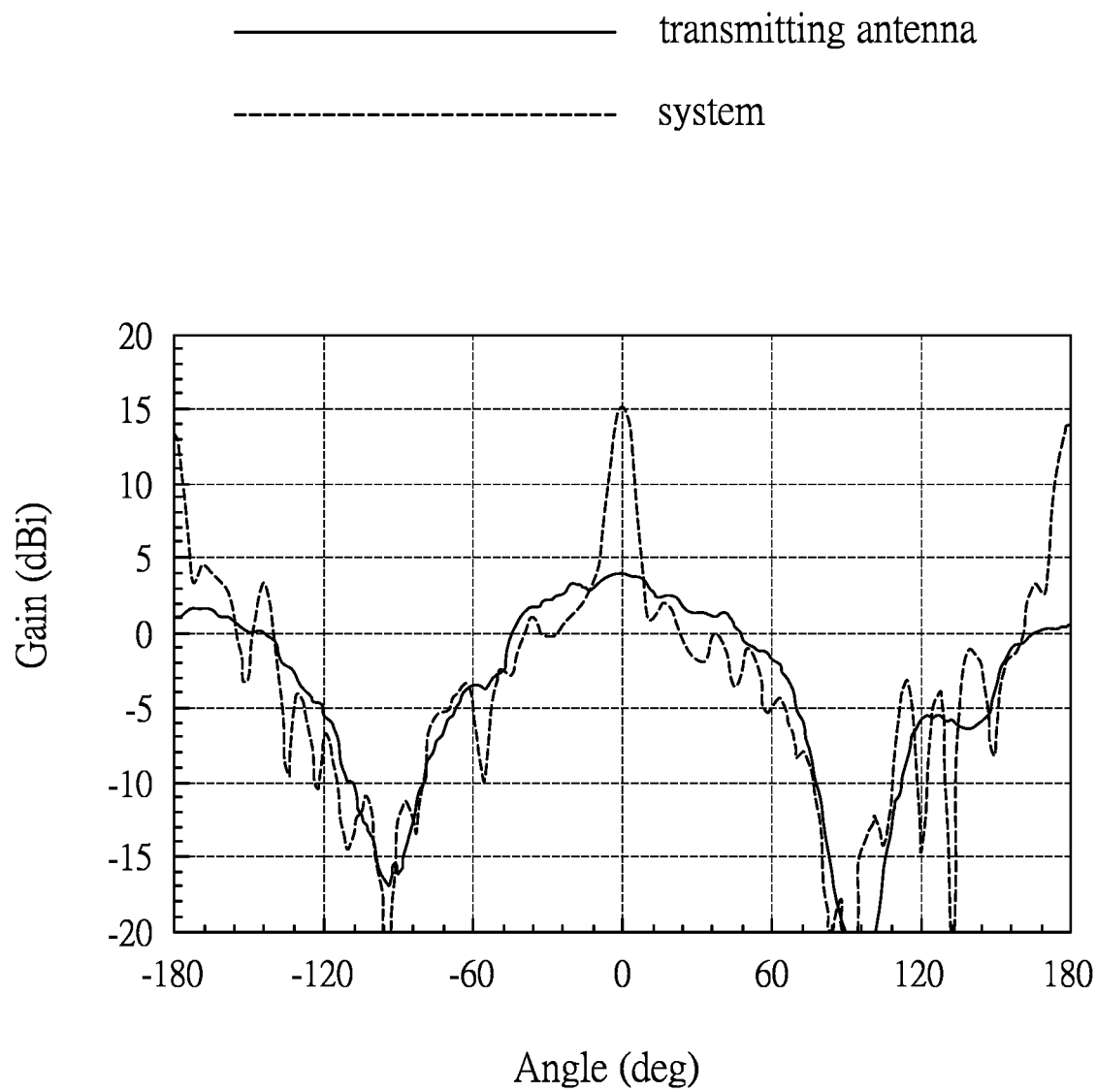
FIG. 18 is a measurement diagram showing Y-Z plane field patterns that, measured in an anechoic chamber, correspond respectively to the transmitting antenna and the system mentioned above in relation to FIG. 17.

Please refer to FIG. 15 and FIG. 16 for the second embodiment of this disclosure. The second embodiment is similar to the first embodiment except that the substrate 1 is a flexible plate. The flexible plate can be curved as needed such that the electromagnetic wave transmission structure 10 has a higher degree of freedom and can better adapt to the environment when actually deployed. In this embodiment, the substrate 1 is silicone and has a thickness of 0.1 mm, the frequency of the electromagnetic wave is 28 GHz, and the distance between the electromagnetic wave transmission structure 10 and the transmitting antenna 3 is three times the wavelength of the electromagnetic wave. This electromagnetic wave transmission structure 10 is also placed in an anechoic chamber for measurement. FIG. 17 shows the X-Z plane field patterns obtained, and FIG. 18 shows the Y-Z plane field patterns obtained. As can be seen in the measurement diagrams, the system formed by the electromagnetic wave transmission structure 10 and the transmitting antenna 3 exhibits an increase of gain of 11.3 dBi over the gain of the transmitting antenna 3, and the half-power beam width (the 3 dBi beam width) is reduced to 10.5°. The measurement results verify that the substrate 1 is equally capable of causing convergence of the electromagnetic wave when implemented as a flexible plate.

Figure 19:
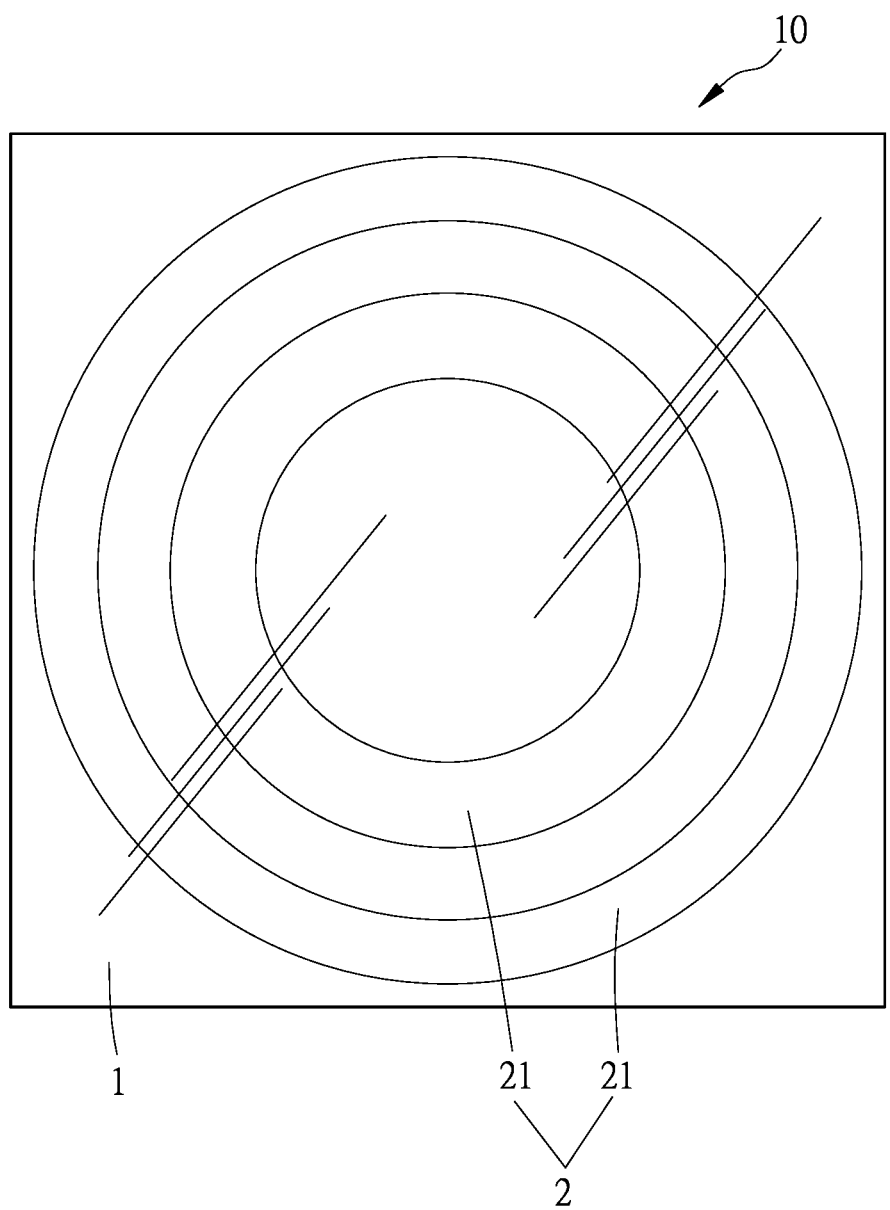
FIG. 19 is a top view of the third embodiment of this disclosure.
Figure 20:
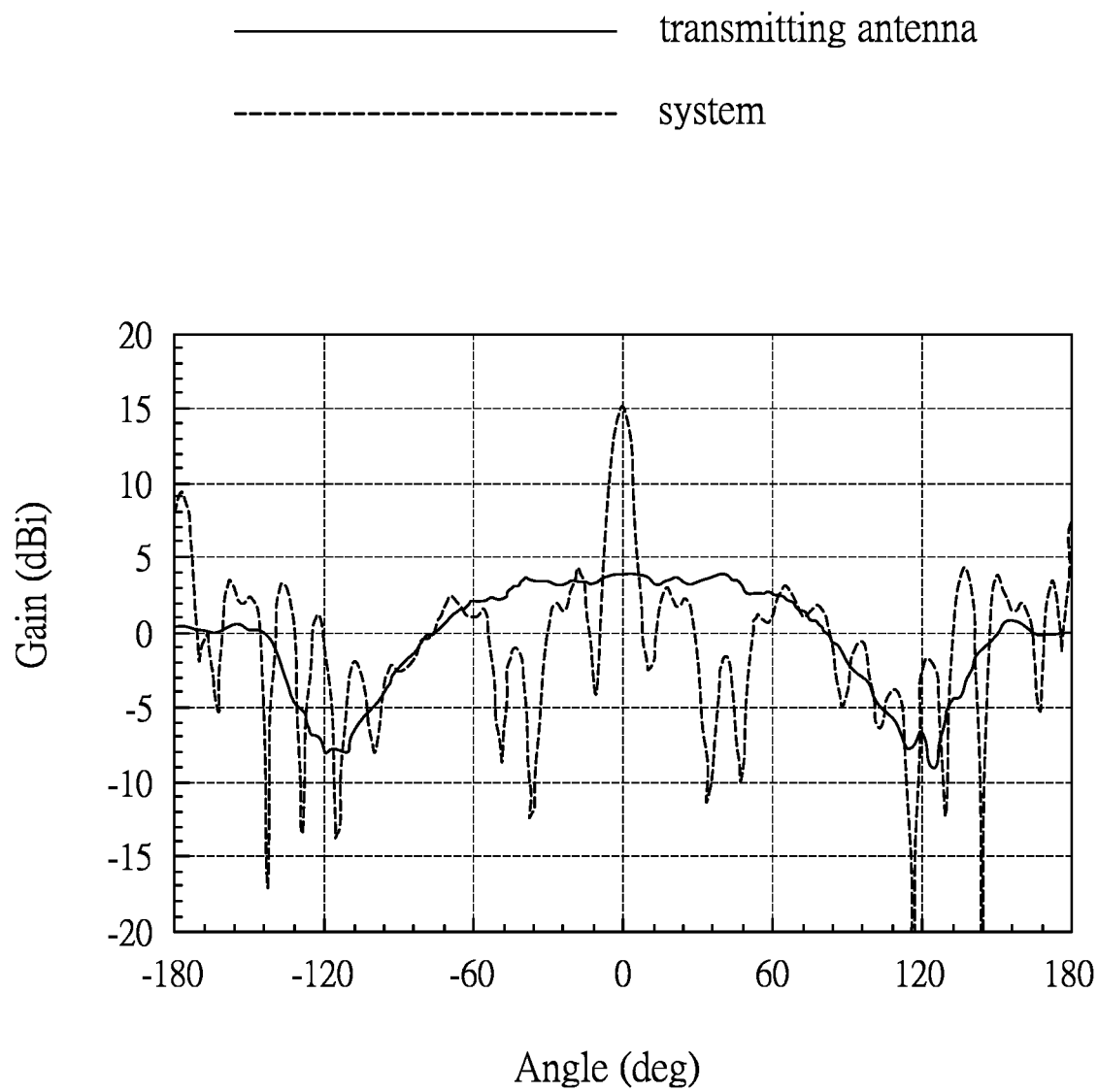
FIG. 20 is a measurement diagram showing X-Z plane field patterns that, measured in an anechoic chamber, correspond respectively to a transmitting antenna and a system composed of the transmitting antenna and the third embodiment.
Figure 21:
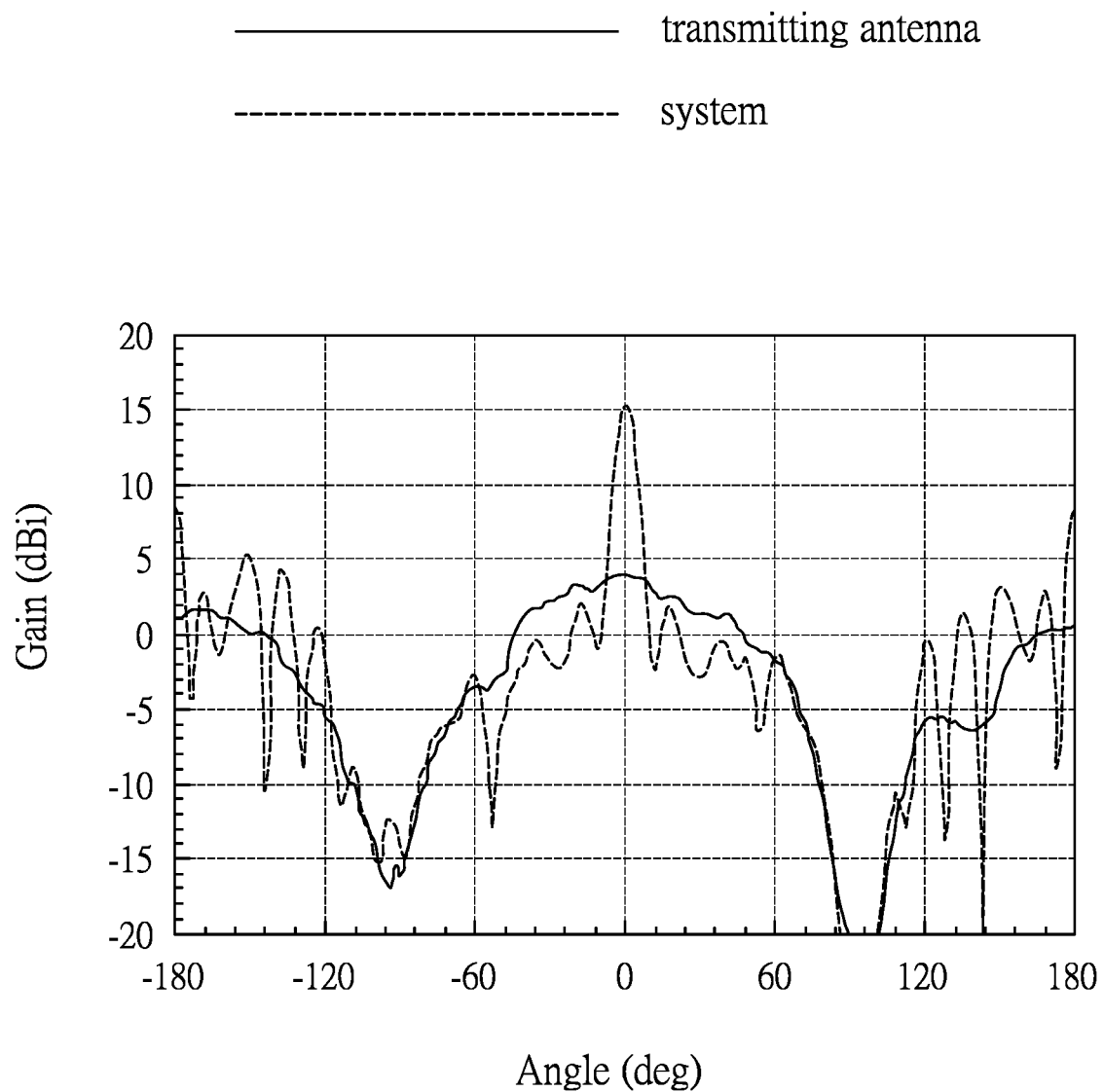
FIG. 21 is a measurement diagram showing Y-Z plane field patterns that, measured in an anechoic chamber, correspond respectively to the transmitting antenna and the system mentioned above in relation to FIG. 20.

Please refer to FIG. 19 for the third embodiment of this disclosure. The third embodiment is similar to the first embodiment except that the transmission unit 2 is transparent. In this embodiment, the transmission unit 2 is made of indium tin oxide, which is both transparent and electrically conductive when formed into a film. This transmission unit 2 may be provided on a substrate 1 that is also transparent so that the third embodiment can be deployed on a window for example, thereby providing the electromagnetic wave transmission structure 10 with higher flexibility and wider application in terms of deployment. In this embodiment, the thickness of the substrate 1 is 0.7 mm, the thickness of the transmission unit 2 is 2610 Å, the electrical resistivity of the transmission unit 2 is $1.305 \times 10^6$ Ωm, the conductivity of the transmission unit 2 is $7.6 \times 10^5$ $Sm^{-1}$, the frequency of the electromagnetic wave is 28 GHz, and the distance between the electromagnetic wave transmission structure 10 and the transmitting antenna 3 is three times the wavelength of the electromagnetic wave. This electromagnetic wave transmission structure 10 is also placed in an anechoic chamber for measurement. FIG. 20 shows the X-Z plane field patterns obtained, and FIG. 21 shows the Y-Z plane field patterns obtained. As can be seen in the measurement diagrams, the system formed by the electromagnetic wave transmission structure 10 and the transmitting antenna exhibits an increase of gain of 11.1 dBi over the gain of the transmitting antenna, and the half-power beam width is reduced to 10°. The measurement results verify that the transparent transmission unit 2 is equally capable of causing convergence of the electromagnetic wave.

Figure 22:
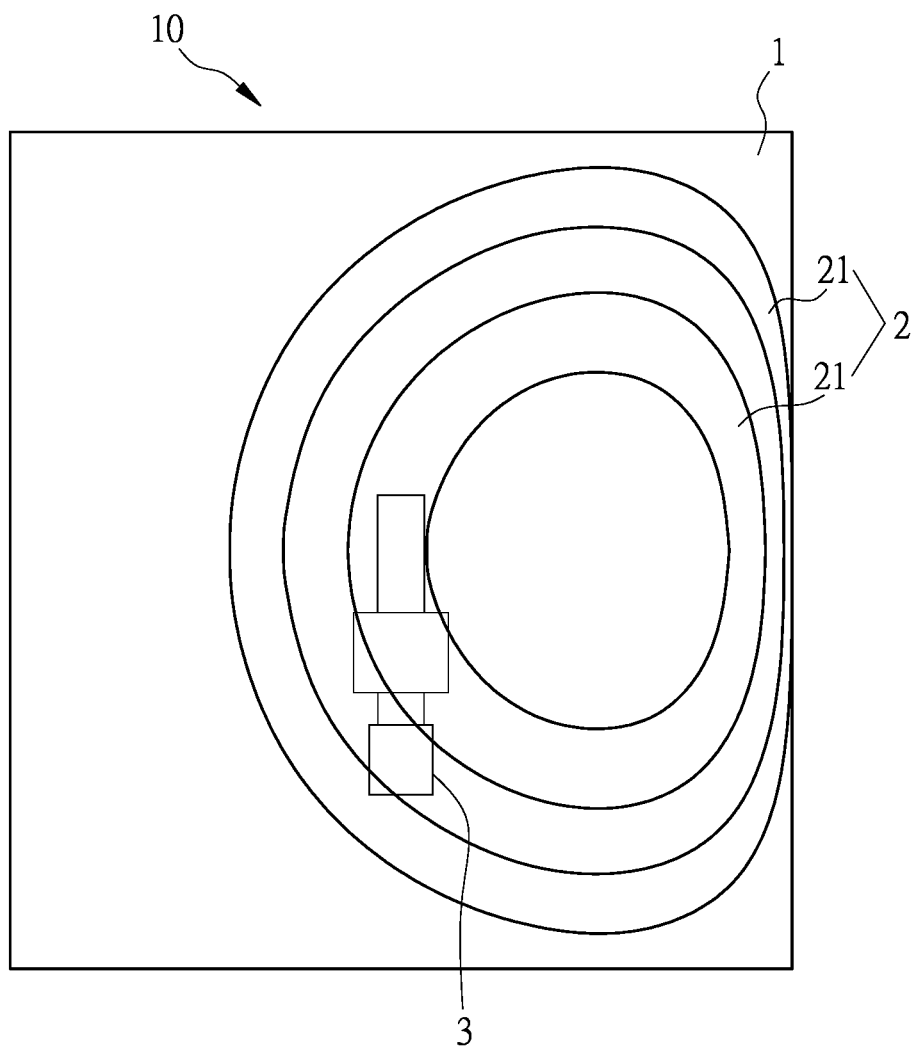
FIG. 22 schematically shows the fourth embodiment of this disclosure.
Figure 23:
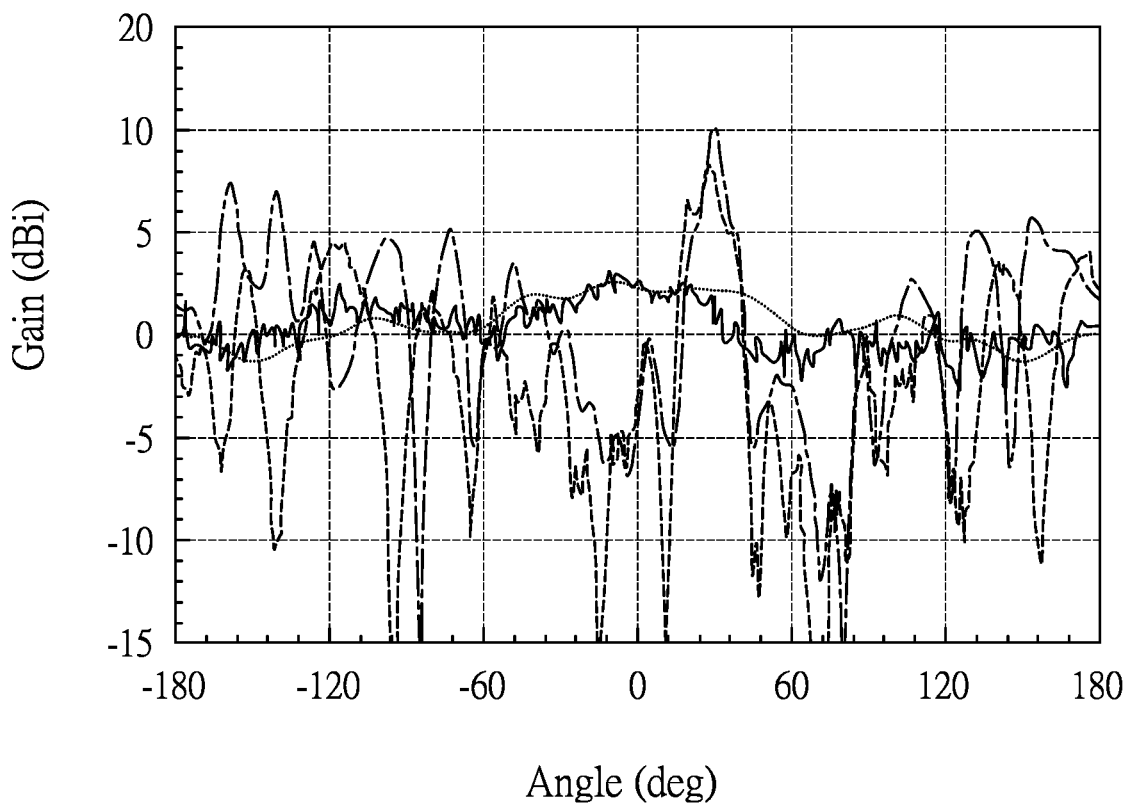
FIG. 23 is a measurement and simulation diagram showing X-Y plane field patterns of the fourth embodiment.

Please refer to FIG. 22 and FIG. 23 for the fourth embodiment of this disclosure. The fourth embodiment is similar to the second embodiment in that the substrate 1 is wound into a cylindrical shape as shown in FIG. 16, but is different from the second embodiment in that the transmission unit 2 is transparent, that the distance between the electromagnetic wave transmission structure 10 and the transmitting antenna 3 is five times the wavelength of the electromagnetic wave, and that the transmitting antenna 3 is an asymmetric strip-like collinear antenna. The electromagnetic wave transmission structure 10 is wound along a reference circle whose center is defined by the transmitting antenna 3 and whose radius is five times the wavelength of the electromagnetic wave. When the electromagnetic wave emitted by the transmitting antenna 3 passes through the electromagnetic wave transmission structure 10, an increase of gain is observed along with a reduction in the half-power beam width. After the electromagnetic wave transmission structure 10 is rotated by 30°, measurement is carried out again, and the measurement result shows that a change in position of the electromagnetic wave transmission structure 10 changes the main beam direction of the electromagnetic wave.

Figure 24:
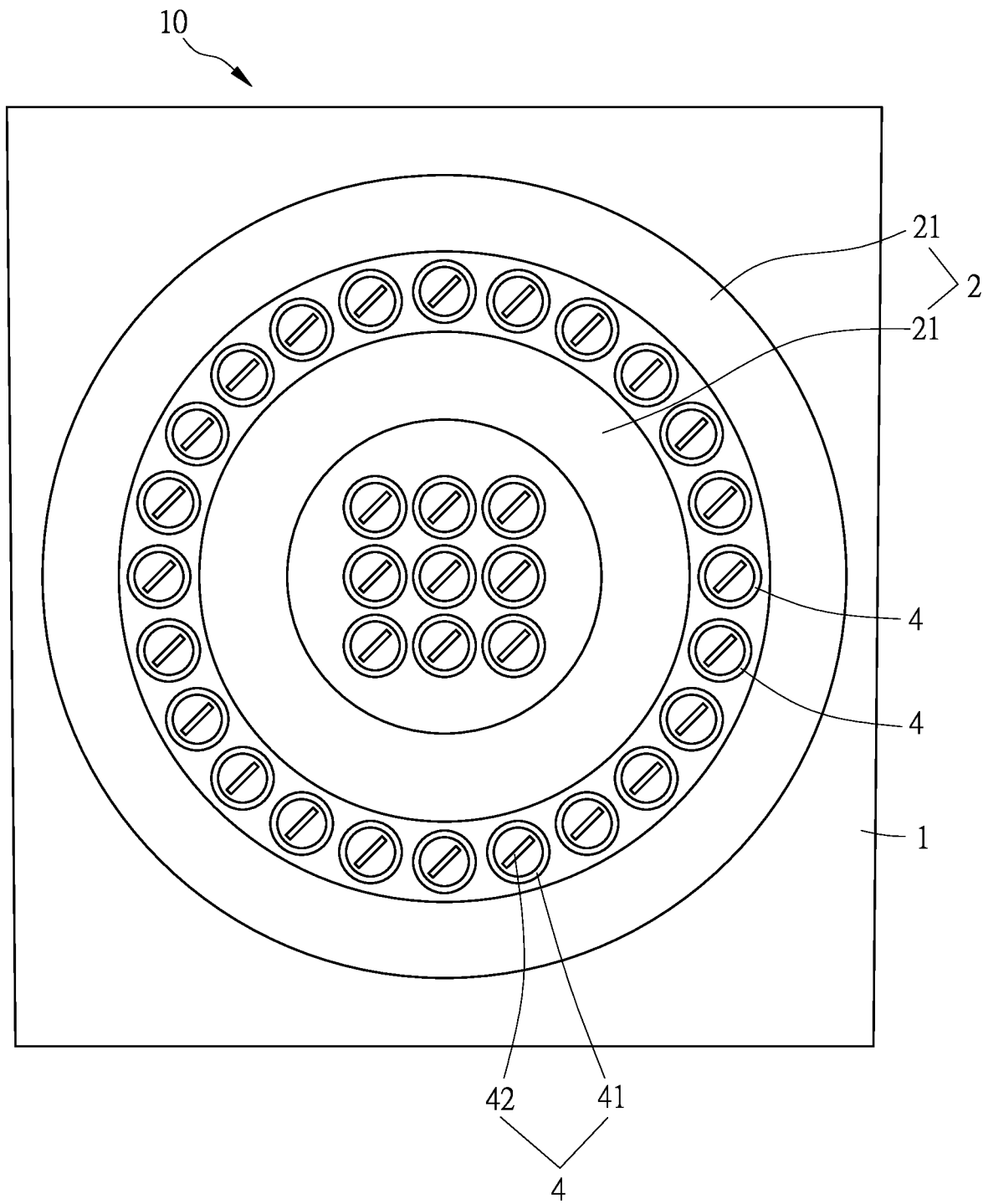
FIG. 24 schematically shows the fifth embodiment of this disclosure.

Please refer to FIG. 24 for the fifth embodiment of this disclosure. The fifth embodiment is similar to the third embodiment except that the electromagnetic wave transmission structure 10 further includes a plurality of polarization units 4 provided on the substrate 1. Please note that when a plurality of annular metal plates 21 are provided, the polarization units 4 are located in at least one of the area surrounded by the annular metal plate 21 closest to the center, the area between two adjacent annular metal plates 21, and the area outside the annular metal plate 21 farthest away from the center. The larger the extent over which the polarization units 4 are distributed, the more significant the polarization changing effect. In this embodiment, the polarization units 4 are located in the area surrounded by the annular metal plate 21 closer to the center and the area between the two annular metal plates 21. Each polarization unit 4 is configured to change the polarization of the electromagnetic wave. In this embodiment, each polarization unit 4 includes an annular plate 41 and a rectangular plate 42 surrounded by the annular plate 41, each rectangular plate 42 has an inclination angle of 45° with respect to a horizontal line, the annular plates 41 and the rectangular plates 42 are made of metal, and each polarization unit 4 is configured to change linear polarization into circular polarization. In contrast to the second embodiment, in which the electromagnetic wave transmission structure 10 does not change the polarization of the electromagnetic wave passing through the structure but only has the advantage of causing convergence of the electromagnetic wave, the fifth embodiment is so designed that the electromagnetic wave transmission structure 10 allows the electromagnetic wave passing therethrough to have an antenna axial ratio smaller than 3 dBi within the angular range from −7° to 6°; in other words, the portion of the electromagnetic wave that is within the angular range from −7° to 6° will approach circular polarization thanks to the polarization units 4. In addition, the electromagnetic wave transmission structure 10 has a half-power beam width ranging from −3° to 3°, which is within the angular range over which the antenna axial ratio is smaller than 3 dBi. The electromagnetic wave transmission structure 10, therefore, may change the polarization of the electromagnetic wave differently depending on the polarization units 4 used. If each polarization unit 4 is a linear polarization unit, the electromagnetic wave transmission structure 10 will change the electromagnetic wave into linear polarization; if each polarization unit 4 is an elliptical polarization unit, the electromagnetic wave transmission structure 10 will change the electromagnetic wave into elliptical polarization instead.

Figure 25:
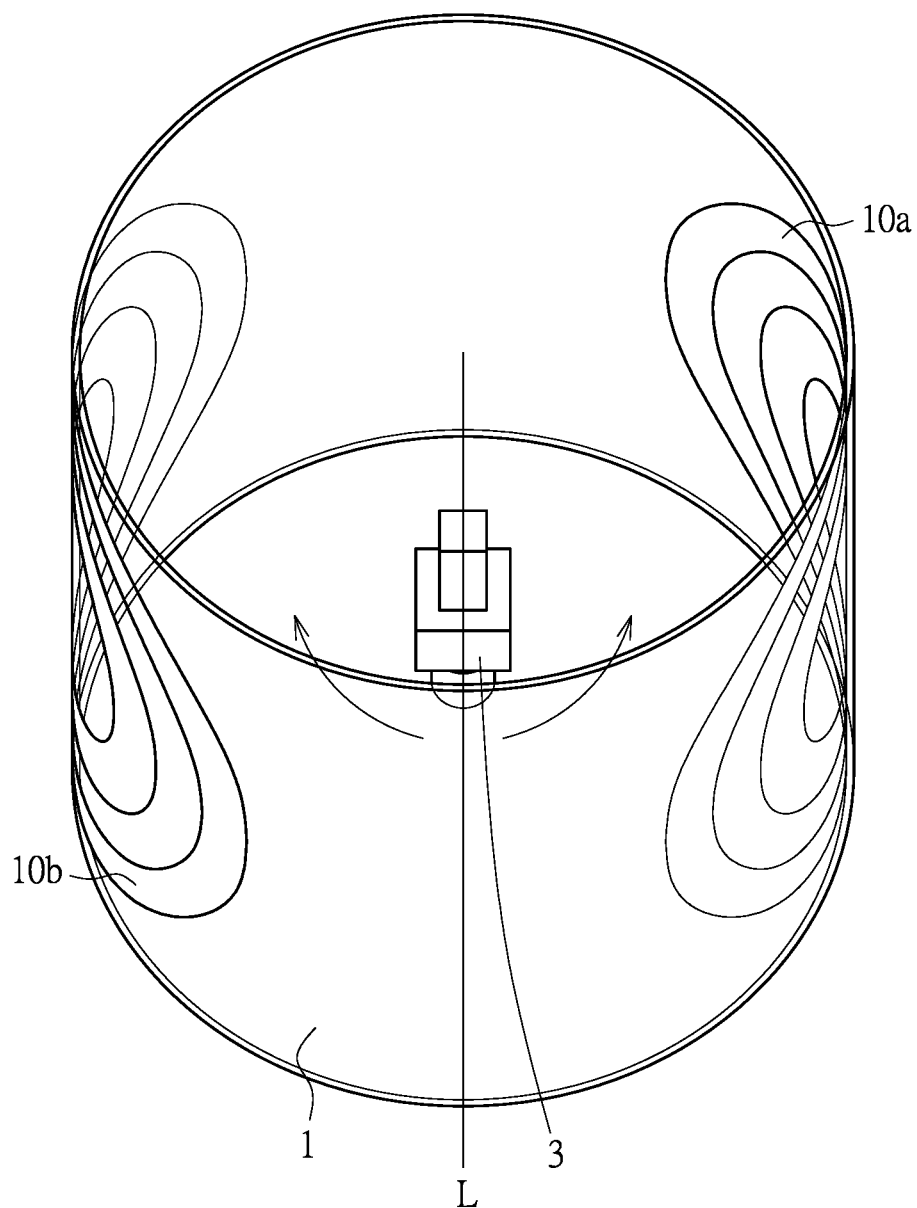
FIG. 25 schematically shows the sixth embodiment of this disclosure.
Figure 26:
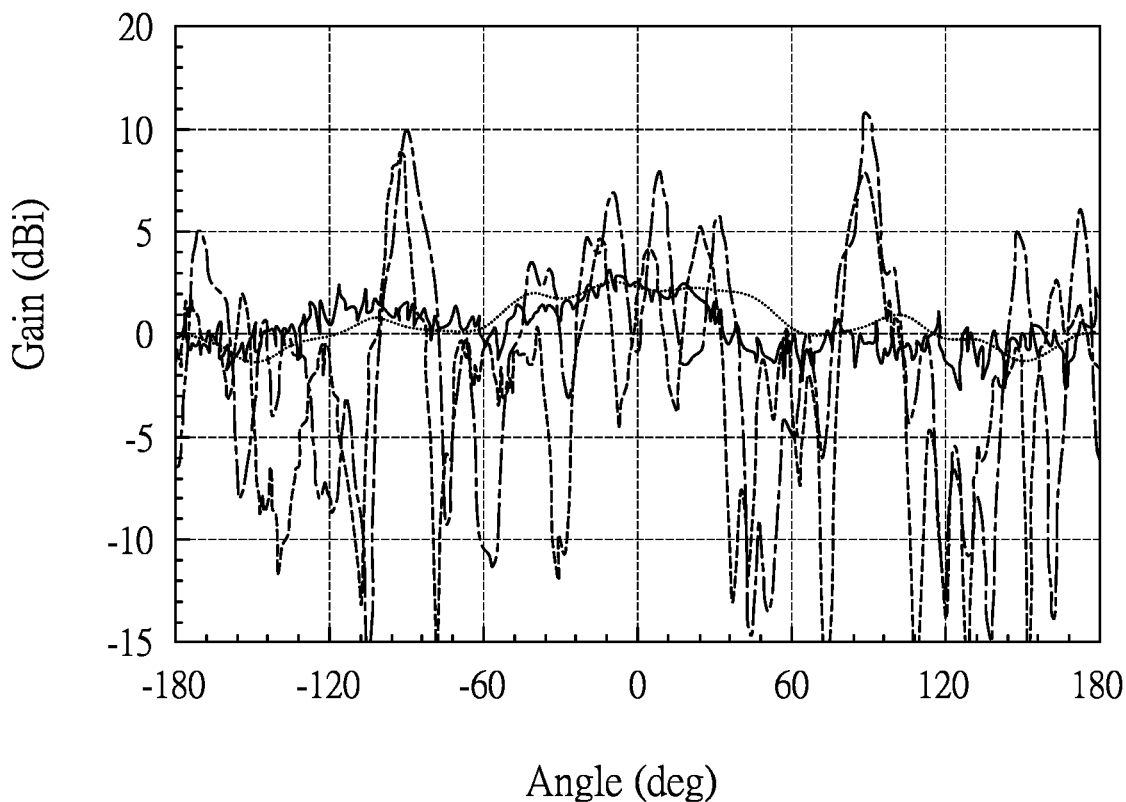
FIG. 26 is a measurement and simulation diagram showing X-Y plane field patterns of the sixth embodiment.

Please refer to FIG. 25 and FIG. 26 for the sixth embodiment of this disclosure. The sixth embodiment is an electromagnetic wave transmission structure array. The electromagnetic wave transmission structure array includes a plurality of electromagnetic wave transmission structures 10. The substrate 1 of each electromagnetic wave transmission structure 10 is wound into a cylindrical shape as in the fourth embodiment. The electromagnetic wave transmission structures 10 are arranged along a reference circle whose center is defined by a reference point and whose radius is a distance related to the wavelength of the electromagnetic wave. Each electromagnetic wave transmission structure 10 forms an included angle with a reference coordinate axis L, and the reference coordinate axis L passes through the reference point. In this embodiment, two electromagnetic wave transmission structures 10 are used, the radius is five times the wavelength of the electromagnetic wave, and the transmitting antenna 3 is disposed at the reference point. To facilitate description, the electromagnetic wave transmission structures 10 are indicated by different reference numerals respectively. The electromagnetic wave transmission structure 10a is rotated by 90° with respect to the reference coordinate axis L, and the other electromagnetic wave transmission structure 10b is rotated by −90° with respect to the reference coordinate axis L. The electromagnetic wave transmission structure 10a and the electromagnetic wave transmission structure 10b overlap each other, with the electromagnetic wave transmission structure 10a being closer to the transmitting antenna 3, and the electromagnetic wave transmission structure 10b being farther away from the transmitting antenna 3. As can be seen in FIG. 26, the electromagnetic wave emitted by the transmitting antenna 3 forms two main beams at 90° and −90° respectively after passing through the electromagnetic wave transmission structure array. That is to say, the electromagnetic wave transmission structure array can cause the electromagnetic wave passing therethrough to converge into multiple main beams.

Figure 27:
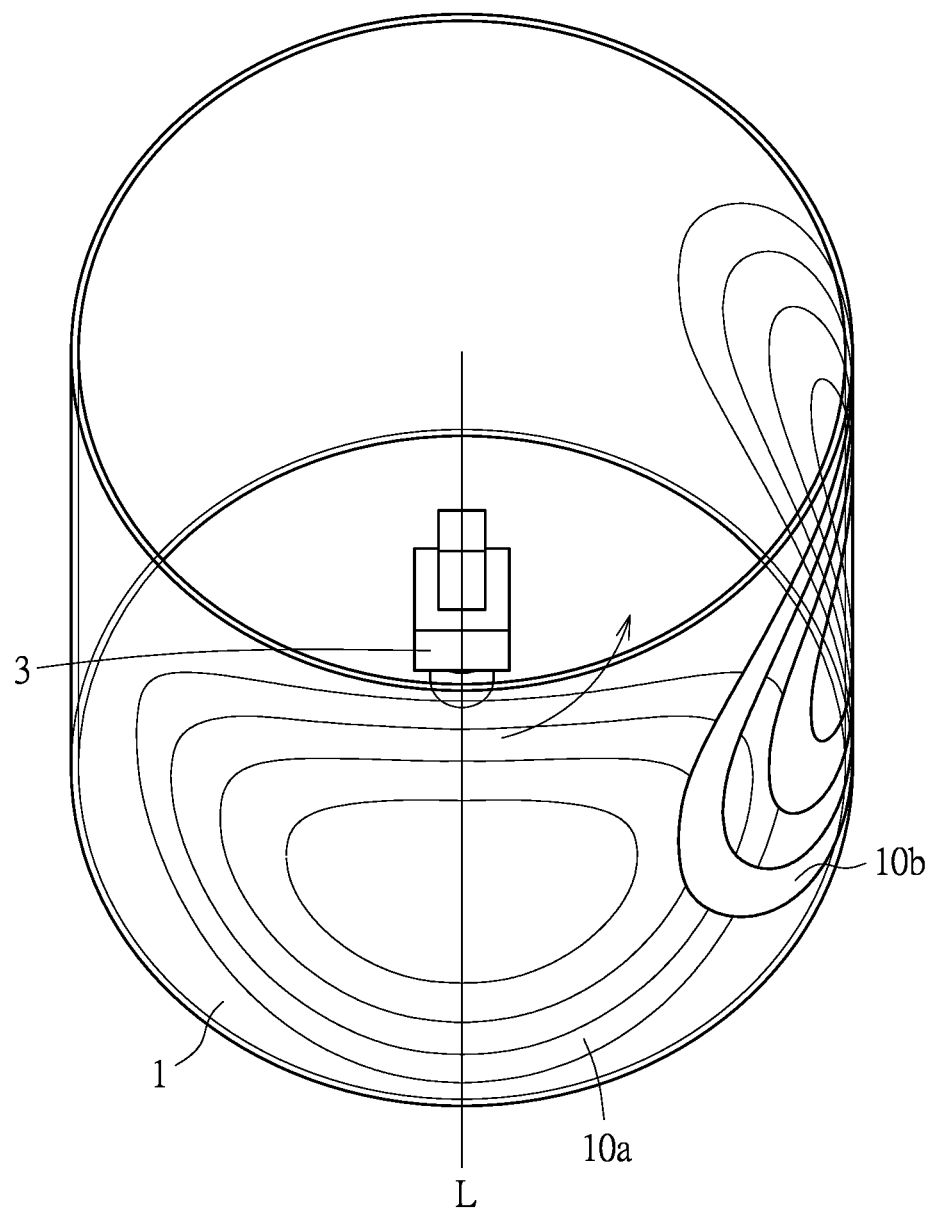
FIG. 27 schematically shows the seventh embodiment of this disclosure.
Figure 28:
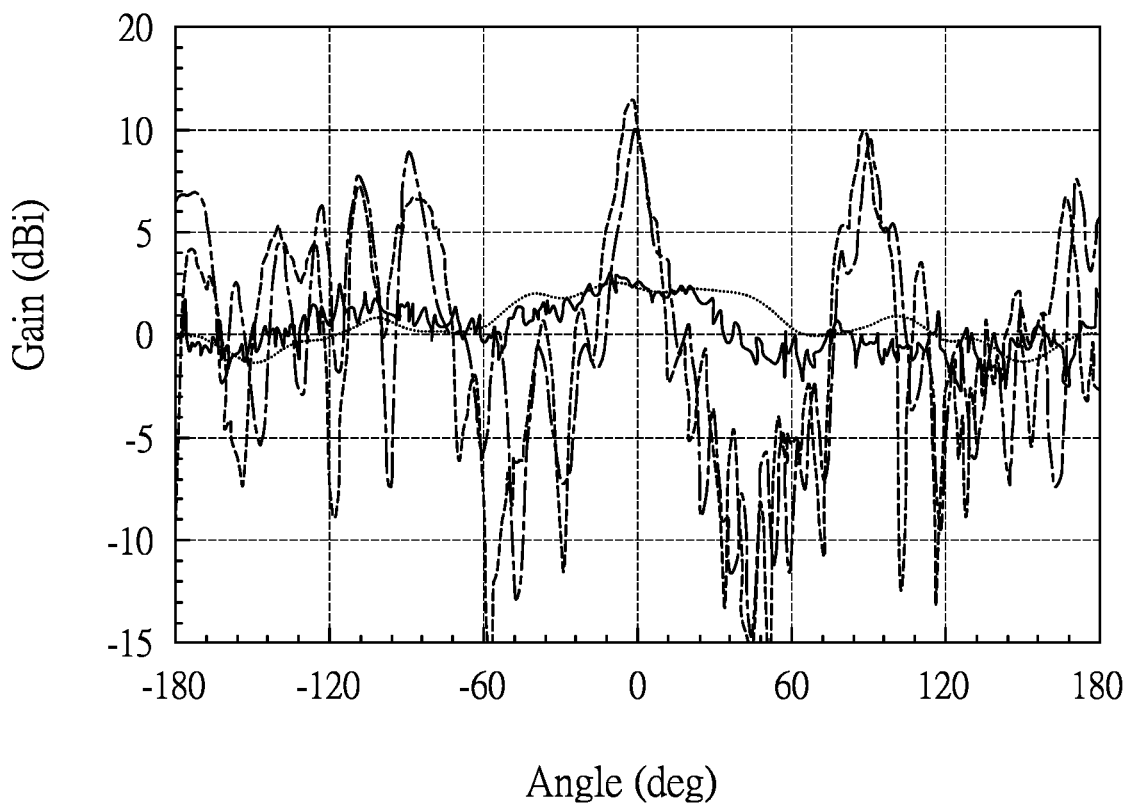
FIG. 28 is a measurement and simulation diagram showing X-Z plane field patterns of the seventh embodiment.

Please refer to FIG. 27 and FIG. 28 for the seventh embodiment of this disclosure. The seventh embodiment is similar to the sixth embodiment except that the electromagnetic wave transmission structure 10a and the reference coordinate axis L form an included angle of 0° while the other electromagnetic wave transmission structure 10b is rotated by 90° with respect to the reference coordinate axis L. The electromagnetic wave transmission structure 10a and the electromagnetic wave transmission structure 10b overlap each other, with the electromagnetic wave transmission structure 10a being closer to the transmitting antenna 3, and the electromagnetic wave transmission structure 10b being farther away from the transmitting antenna 3. As can be seen in FIG. 28, the electromagnetic wave emitted by the transmitting antenna 3 forms two main beams at 0° and 90° respectively after passing through the electromagnetic wave transmission structure array.

Figure 29:
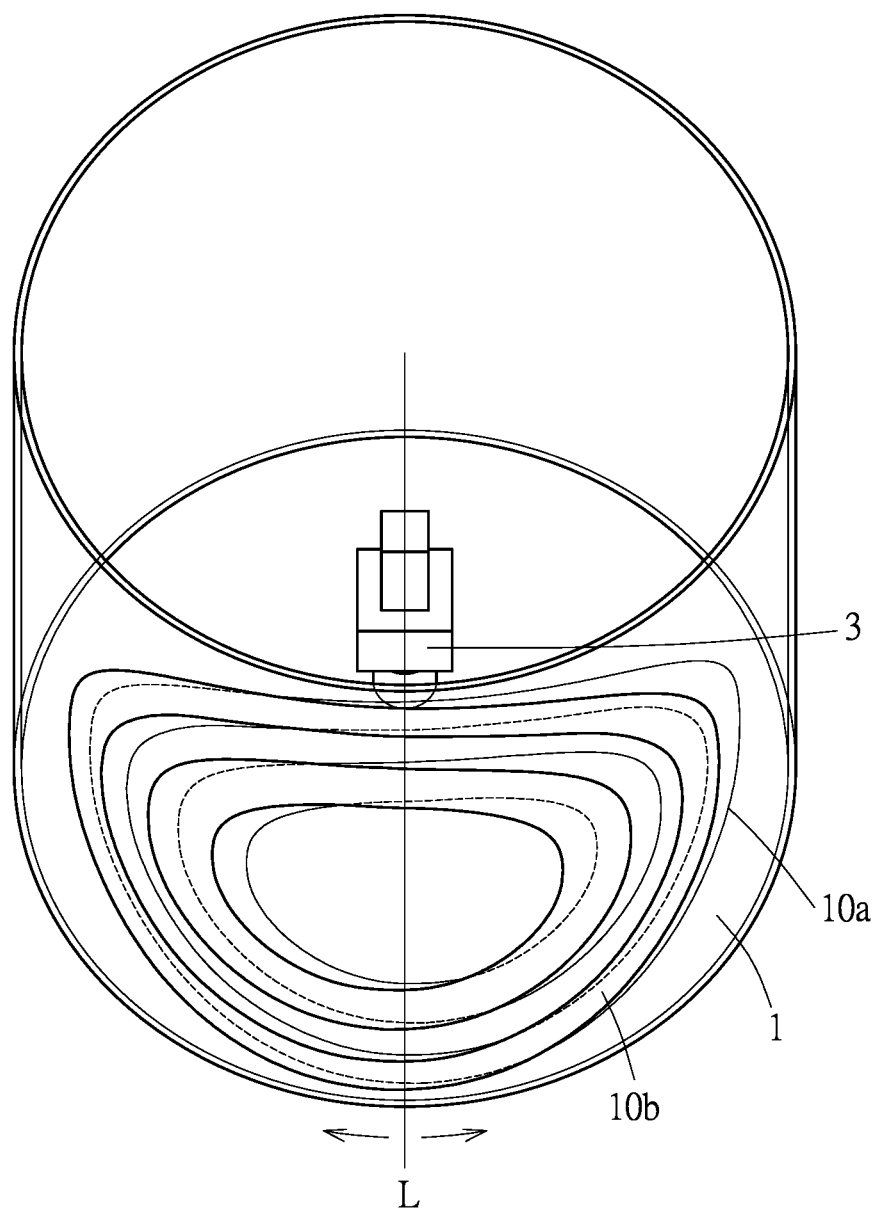
FIG. 29 schematically shows the eighth embodiment of this disclosure.

Please refer to FIG. 29 for the eighth embodiment of this disclosure. The eighth embodiment is similar to the sixth embodiment except that the electromagnetic wave transmission structure 10a is rotated by 5° with respect to the reference coordinate axis L while the other electromagnetic wave transmission structure 10b is rotated by −5° with respect to the reference coordinate axis L. The electromagnetic wave transmission structure 10a and the electromagnetic wave transmission structure 10b overlap each other, with the electromagnetic wave transmission structure 10a being closer to the transmitting antenna 3, and the electromagnetic wave transmission structure 10b being farther away from the transmitting antenna 3. The electromagnetic wave emitted by the transmitting antenna 3 forms a relatively wide main beam after passing through the electromagnetic wave transmission structure array, and a beam shaping effect is thus achieved.

Please refer to FIG. 30 and FIG. 31 for the ninth embodiment of this disclosure. The ninth embodiment is similar to the first embodiment except that each annular metal plate 21 is dodecagonal. If it is preset that the reference axis D is the X-Z plane, and that the farther away from the reference axis D an inner radius is, the greater the weight of the inner radius will be, then the weight of each inner radius can be defined as the absolute value of the cosine function of the reference included angle β. The inner radii of each annular metal plate 21 can be derived from the corresponding dodecagonal function, and after a weighted averaging operation, the inner radii of the $n^{th}$ annular metal plate 21 should match the function value of the inner radius function $h_{ni}$. Similarly, the outer radii of each annular metal plate 21 can be derived from the corresponding dodecagonal function, and after a weighted averaging operation, the outer radii of the $n^{th}$ annular metal plate 21 should match the function value of the outer radius function $h_{no}$. As can be seen in FIG. 31, the gain of the system in the main beam direction approaches 17 dB when each annular metal plate 21 is dodecagonal or decagonal, and the gain of the system in the main beam direction is between 15 dB and 16 dB when each annular metal plate 21 is octagonal.

Figure 32:
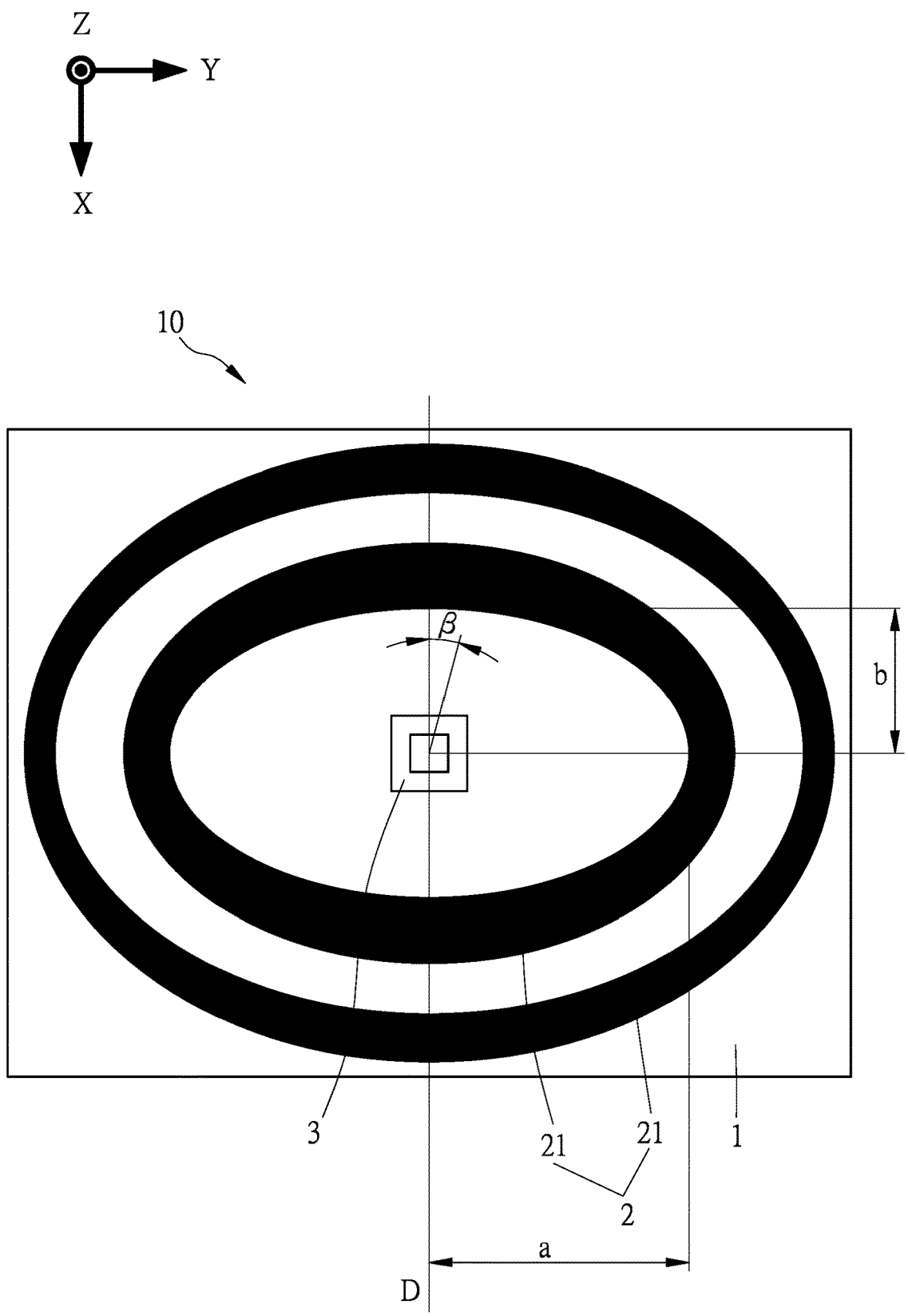
FIG. 32 schematically shows the tenth embodiment of this disclosure.

Please refer to FIG. 32 for the tenth embodiment of this disclosure. The tenth embodiment is similar to the ninth embodiment except that each annular metal plate 21 is elliptical. If it is preset that the reference axis D is the X-Z plane, the weight of each inner radius can be defined as the absolute value of the cosine function of the reference included angle β.

The inner circumference of the first annular metal plate 21 can be expressed by the following equation:

$$\frac{x^2}{b^2} + \frac{y^2}{a^2} = 1$$

where (x,y) represents the coordinates of the inner circumference of the first annular metal plate 21 in the X-Y plane, a represents one half of the major axis of the ellipse, and b represents one half of the minor axis of the ellipse.

The inner radii of the first annular metal plate 21 can be derived from the following equation involving the major axis and minor axis of the ellipse in order to determine the proper configuration of the first annular metal plate 21:

$$h_{1i} = \frac{\int_0^{2\pi} \sqrt{x^2+y^2}\,|\cos\beta|d\beta}{\int_0^{2\pi} |\cos\beta|d\beta} = \frac{\int_0^{2\pi} \sqrt{b^2\cos^2\beta + a^2\sin^2\beta}\,|\cos\beta|d\beta}{\int_0^{2\pi} |\cos\beta|d\beta}$$

Thus, each annular metal plate 21 can be designed as having an arbitrary closed annular shape defined by the corresponding functions.

According to the above, the electromagnetic wave transmission structure 10 can cause convergence of an incident electromagnetic wave, provide an increased gain in the receiving direction, and more importantly, shift the electromagnetic wave by the angle θ after the electromagnetic wave impinges on, and before the electromagnetic wave exits, the electromagnetic wave transmission structure 10, with the angle θ ranging from −25° to 25° and the associated gain reduction being less than 3 dBi. Therefore, the electromagnetic wave transmission structure 10 can be installed to shift the electromagnetic wave impinging thereon in order for the electromagnetic wave to enter a communication dead zone, thereby providing an easy solution to the problem of poor signal reception in that communication dead zone. Besides, depending on actual deployment needs, the electromagnetic wave transmission structure 10 can be modified in various ways; for example, the substrate 1 may be implemented as a rigid or flexible plate, or the transmission unit 2 may be opaque or transparent. None of these modifications will compromise the intended effect of causing the energy of an incident electromagnetic wave to converge. Furthermore, by winding the substrate 1 into a cylindrical shape and arranging its position properly, the main beam direction of an electromagnetic wave passing through the electromagnetic wave transmission structure 10 can be changed. Also, the polarization units 4 can change the polarization of an electromagnetic wave passing through the electromagnetic wave transmission structure 10. Moreover, the electromagnetic wave transmission structure array allows an electromagnetic wave passing therethrough to converge into multiple main beams at the same time.

The description of the foregoing embodiments should be able to enable a full understanding of the operation, use, and intended effects of the subject matter disclosed herein. Those embodiments, however, are only some preferred ones of this disclosure and are not intended to be restrictive of the scope of the disclosure. All simple equivalent changes and modifications based on the disclosure of this specification and the appended claims shall fall within the scope of the disclosure.

What is claimed is:

1. An electromagnetic wave transmission structure, adapted to cause convergence of an electromagnetic wave, the electromagnetic wave transmission structure comprising:
   a substrate; and
   a transmission unit provided on the substrate, the transmission unit including an annular metal plate, the annular metal plate having a weighted average inner radius and a weighted average outer radius each related to a wavelength of the electromagnetic wave, to a focal length defined as a distance between the electromagnetic wave transmission structure and a focal point defined as a point of convergence of the electromagnetic wave, and to an incident distance defined as a distance between a source of the electromagnetic wave and the focal point, wherein a plurality of inner radii and a plurality of outer radii respectively of an entire inner circumference and an entire outer circumference of the annular metal plate have a same trend of variation, the inner radii correspond respectively to a plurality of weights related respectively to a plurality of reference included angles formed between the inner radii and a reference axis passing through a center of the annular metal plate, and the outer radii correspond respectively to a plurality of weights related respectively to a plurality of said reference included angles formed between the outer radii and the reference axis.

2. The electromagnetic wave transmission structure of claim 1, wherein the annular metal plate is of one selected from the group consisting of a circular shape, an elliptical shape, and a polygonal shape, and the weighted average inner radius and the weighted average outer radius are respectively equivalent to a function value of the following inner radius function and a function value of the following outer radius function:

$$h_i = \sqrt{\frac{\left(c^2 - cd - \left(\frac{\lambda}{4}+c\right)^2 - \left(\frac{\lambda}{4}+c\right)d\right)}{\left(c^2 - cd - \left(\frac{\lambda}{4}+c\right)^2 + \left(\frac{\lambda}{4}+c\right)d\right)}{\left(\frac{\lambda}{4}+c\right)^2}}$$

$$h_o = \sqrt{\frac{\left(c^2 - cd - \left(\frac{2\lambda}{4}+c\right)^2 - \left(\frac{2\lambda}{4}+c\right)d\right)}{\left(c^2 - cd - \left(\frac{2\lambda}{4}+c\right)^2 + \left(\frac{2\lambda}{4}+c\right)d\right)}{\left(\frac{2\lambda}{4}+c\right)^2}}$$

where $h_i$ is the inner radius function, $h_i$ is the outer radius function, c is one half of the incident distance, d is the focal length, and $\lambda$ is the wavelength.

3. The electromagnetic wave transmission structure of claim 1, wherein the substrate is one selected from the group consisting of a rigid plate and a flexible plate.

4. The electromagnetic wave transmission structure of claim 1, wherein the transmission unit is transparent or opaque.

5. The electromagnetic wave transmission structure of claim 3, wherein the substrate is wound into a cylindrical shape when implemented as the flexible plate.

6. The electromagnetic wave transmission structure of claim 1, further comprising a plurality of polarization units, the polarization units being provided on the substrate and surrounded by the annular metal plate, wherein each said polarization unit is configured to change a polarization of the electromagnetic wave.

7. An electromagnetic wave transmission structure, adapted to cause convergence of an electromagnetic wave, the electromagnetic wave transmission structure comprising:

a substrate; and a transmission unit provided on the substrate, the transmission unit including a plurality of annular metal plates, each said annular metal plate having a weighted average inner radius different from the weighted average inner radius of another said annular metal plate, the annular metal plates being arranged at intervals around a same center, each said annular metal plate further having a weighted average outer radius, the weighted average inner radius and the weighted average outer radius of each said annular metal plate being each related to an arrangement order of the each said annular metal plate with respect to the center, to a wavelength of the electromagnetic wave, to a focal length defined as a distance between the electromagnetic wave transmission structure and a focal point defined as a point of convergence of the electromagnetic wave, and to an incident distance defined as a distance between a source of the electromagnetic wave and the focal point, wherein a plurality of inner radii and a plurality of outer radii respectively of an entire inner circumference and an entire outer circumference of each said annular metal plate have a same trend of variation, the inner radii of each said annular metal plate correspond respectively to a plurality of weights related respectively to a plurality of reference included angles formed between the inner radii and a reference axis passing through the center of the annular metal plates, and the outer radii of each said annular metal plate correspond respectively to a plurality of weights related respectively to a plurality of said reference included angles formed between the outer radii and the reference axis.

8. The electromagnetic wave transmission structure of claim 7, wherein each said annular metal plate is of one selected from the group consisting of a circular shape, an elliptical shape, and a polygonal shape, and the weighted average inner radius and the weighted average outer radius of each said annular metal plate are respectively equivalent to a function value of the following inner radius function and a function value of the following outer radius function:

$$\lambda_{ni} = \sqrt{\frac{\left(c^2 - cd - \left(\frac{(2n-1)\lambda}{4} + c\right)^2 - \left(\frac{(2n-1)\lambda}{4} + c\right)d\right)}{\left(c^2 - cd - \left(\frac{(2n-1)\lambda}{4} + c\right)^2 + \left(\frac{(2n-1)\lambda}{4} + c\right)d\right)}}{\left(\frac{(2n-1)\lambda}{4} + c\right)^2}}$$

$$\lambda_{no} = \sqrt{\frac{\left(c^2 - cd - \left(\frac{2n\lambda}{4} + c\right)^2 - \left(\frac{2n\lambda}{4} + c\right)d\right)}{\left(c^2 - cd - \left(\frac{2n\lambda}{4} + c\right)^2 + \left(\frac{2n\lambda}{4} + c\right)d\right)}}{\left(\frac{2n\lambda}{4} + c\right)^2}}$$

where n indicates an $n^{th}$ said annular metal plate sequentially arranged outward from the center, $h_{ni}$ is the inner radius function of the $n^{th}$ annular metal plate, $h_{no}$ is the outer radius function of the $n^{th}$ annular metal plate, c is one half of the incident distance, d is the focal length, and $\lambda$ is the wavelength.

9. The electromagnetic wave transmission structure of claim 7, wherein the substrate is one selected from the group consisting of a rigid plate and a flexible plate.

10. The electromagnetic wave transmission structure of claim 7, wherein the transmission unit is transparent or opaque.

11. The electromagnetic wave transmission structure of claim 9, wherein the substrate is wound into a cylindrical shape when implemented as the flexible plate.

12. The electromagnetic wave transmission structure of claim 7, further comprising a plurality of polarization units, the polarization units being provided on the substrate and located in at least one of an area surrounded by the annular metal plate closest to the center, an area between two adjacent said annular metal plates, and an area outside the annular metal plate farthest away from the center, wherein each said polarization unit is configured to change a polarization of the electromagnetic wave.

13. An electromagnetic wave transmission and shifting method, comprising the step of:

propagating an electromagnetic wave to the electromagnetic wave transmission structure of claim 1 such that the electromagnetic wave is shifted by an angle after impinging on and before exiting the electromagnetic wave transmission structure, the angle being between −25° and 25°;

wherein when an incident direction of the electromagnetic wave is parallel to a normal vector of the electromagnetic wave transmission structure, the electromagnetic wave is shifted by the angle with respect to the normal vector after impinging on and before exiting the electromagnetic wave transmission structure;

wherein when the incident direction of the electromagnetic wave and the normal vector of the electromagnetic wave transmission structure form the angle, the electromagnetic wave is shifted and thereby rendered parallel to the normal vector after impinging on and before exiting the electromagnetic wave transmission structure.

14. An electromagnetic wave transmission and shifting method, comprising the step of:

propagating an electromagnetic wave to the electromagnetic wave transmission structure of claim 7 such that the electromagnetic wave is shifted by an angle after impinging on and before exiting the electromagnetic wave transmission structure, the angle being between −25° and 25°;

wherein when an incident direction of the electromagnetic wave is parallel to a normal vector of the electromagnetic wave transmission structure, the electromagnetic wave is shifted by the angle with respect to the normal vector after impinging on and before exiting the electromagnetic wave transmission structure;

wherein when the incident direction of the electromagnetic wave and the normal vector of the electromagnetic wave transmission structure form the angle, the electromagnetic wave is shifted and thereby rendered parallel to the normal vector after impinging on and before exiting the electromagnetic wave transmission structure.

15. The electromagnetic wave transmission and shifting method of claim 14, wherein each said annular metal plate is of one selected from the group consisting of a circular shape, an elliptical shape, and a polygonal shape, and the weighted average inner radius and the weighted average outer radius of each said annular metal plate are respectively equivalent to a function value of the following inner radius function and a function value of the following outer radius function:

$$\lambda_{ni} = \sqrt{\frac{\left(c^2 - cd - \left(\frac{(2n-1)\lambda}{4} + c\right)^2 - \left(\frac{(2n-1)\lambda}{4} + c\right)d\right)}{\left(\frac{(2n-1)\lambda}{4} + c\right)^2}\left(c^2 - cd - \left(\frac{(2n-1)\lambda}{4} + c\right)^2 + \left(\frac{(2n-1)\lambda}{4} + c\right)d\right)}$$

$$\lambda_{no} = \sqrt{\frac{\left(c^2 - cd - \left(\frac{2n\lambda}{4} + c\right)^2 - \left(\frac{2n\lambda}{4} + c\right)d\right)\left(c^2 - cd - \left(\frac{2n\lambda}{4} + c\right)^2 + \left(\frac{2n\lambda}{4} + c\right)d\right)}{\left(\frac{2n\lambda}{4} + c\right)^2}}$$

where n indicates an $n^{th}$ said annular metal plate sequentially arranged outward from the center, $h_{ni}$ is the inner radius function of the $n^{th}$ annular metal plate, $h_{no}$ is the outer radius function of the $n^{th}$ annular metal plate, c is one half of the incident distance, d is the focal length, and λ is the wavelength.

16. The electromagnetic wave transmission and shifting method of claim 14, wherein the substrate is one selected from the group consisting of a rigid plate and a flexible plate.

17. The electromagnetic wave transmission and shifting method of claim 14, wherein the transmission unit is transparent or opaque.

18. The electromagnetic wave transmission and shifting method of claim 16, wherein the substrate is wound into a cylindrical shape when implemented as the flexible plate.

19. The electromagnetic wave transmission and shifting method of claim 14, wherein the electromagnetic wave transmission structure further comprises a plurality of polarization units, the polarization units are provided on the substrate and located in at least one of an area surrounded by the annular metal plate closest to the center, an area between two adjacent said annular metal plates, and an area outside the annular metal plate farthest away from the center, and each said polarization unit is configured to change a polarization of the electromagnetic wave.

20. An electromagnetic wave transmission structure array, comprising:
a plurality of said electromagnetic wave transmission structures of claim 5;
wherein the electromagnetic wave transmission structures are arranged along a reference circle, the center of the reference circle is defined by a reference point, the radius of the reference circle is a distance related to the wavelength, and each said electromagnetic wave transmission structure forms an included angle with a reference coordinate axis.

21. An electromagnetic wave transmission structure array, comprising:
a plurality of said electromagnetic wave transmission structures of claim 11;
wherein the electromagnetic wave transmission structures are arranged along a reference circle, the center of the reference circle is defined by a reference point, the radius of the reference circle is a distance related to the wavelength, and each said electromagnetic wave transmission structure forms an included angle with a reference coordinate axis.

* * * * *